(12) United States Patent
Mistry et al.

(10) Patent No.: US 12,159,337 B2
(45) Date of Patent: Dec. 3, 2024

(54) STRUCTURAL ASSEMBLY FOR DIGITAL HUMAN INTERACTIVE DISPLAY

(71) Applicant: SAMSUNG ELECTRONICS CO., LTD., Gyeonggi-do (KR)

(72) Inventors: Pranav K. Mistry, Saratoga, CA (US); Jiawei Zhang, Los Gatos, CA (US); Seungsu Hong, Seoul (KR); Abhijit Z. Bendale, Campbell, CA (US)

(73) Assignee: SAMSUNG ELECTRONICS CO., LTD., Gyeonngi-do (KR)

( * ) Notice: Subject to any disclaimer, the term of this patent is extended or adjusted under 35 U.S.C. 154(b) by 0 days.

(21) Appl. No.: 17/571,076

(22) Filed: Jan. 7, 2022

(65) Prior Publication Data

US 2022/0223140 A1 Jul. 14, 2022

Related U.S. Application Data

(60) Provisional application No. 63/135,855, filed on Jan. 11, 2021, provisional application No. 63/135,526, (Continued)

(51) Int. Cl.
*G10L 25/63* (2013.01)
*G06F 3/01* (2006.01)
(Continued)

(52) U.S. Cl.
CPC ............. *G06T 13/00* (2013.01); *G06F 3/011* (2013.01); *G06F 3/147* (2013.01); *G06F 3/16* (2013.01); *G06T 13/40* (2013.01); *G06V 40/174* (2022.01); *G06V 40/20* (2022.01); *G09F 13/049* (2021.05); *G10L 13/02* (2013.01); *G10L 15/063* (2013.01); *G10L 15/16* (2013.01); *G10L 15/22* (2013.01); *G10L 25/63* (2013.01); *H05B 47/12* (2020.01);
(Continued)

(58) Field of Classification Search
None
See application file for complete search history.

(56) References Cited

U.S. PATENT DOCUMENTS 9,992,556 B1  6/2018  Price et al.
10,142,592 B1 * 11/2018  Van Ness ............... H04N 7/147
(Continued)

OTHER PUBLICATIONS

Zhang, X. et al.,"Realistic Speech-Driven Talking Video Generation with Personalized Pose," Complexity, Dec. 28, 2020, vol. 2020, No. 6629634, 8 pg.

(Continued)

*Primary Examiner* — Andre L Matthews
(74) *Attorney, Agent, or Firm* — Cuenot, Forsythe & Kim, LLC

(57) ABSTRACT

A digital human display assembly can include a rectangular display panel enclosed within a frame, the rectangular display panel capable of visually rendering a digital human during an interactive dialogue between the digital human and a user. The digital human display assembly also can include a glass covering enclosed within the frame and extending over a front side of the rectangular display panel. A base can support the frame in an upright position. A light emitting diode (LED) arrangement can be positioned on one or more outer portions of the frame.

19 Claims, 33 Drawing Sheets
(2 of 33 Drawing Sheet(s) Filed in Color)

Related U.S. Application Data filed on Jan. 8, 2021, provisional application No. 63/135,516, filed on Jan. 8, 2021, provisional application No. 63/135,505, filed on Jan. 8, 2021.

(51) Int. Cl.

| | | |
|---|---|---|
| *G06F 3/147* | (2006.01) | |
| *G06F 3/16* | (2006.01) | |
| *G06T 13/00* | (2011.01) | |
| *G06T 13/40* | (2011.01) | |
| *G06V 40/16* | (2022.01) | |
| *G06V 40/20* | (2022.01) | |
| *G09F 13/04* | (2006.01) | |
| *G10L 13/02* | (2013.01) | |
| *G10L 15/06* | (2013.01) | |
| *G10L 15/16* | (2006.01) | |
| *G10L 15/22* | (2006.01) | |
| *H05B 47/12* | (2020.01) | |
| *H05B 47/125* | (2020.01) | |

(52) U.S. Cl.
CPC ......... *H05B 47/125* (2020.01); *G06F 3/012* (2013.01); *G06F 3/017* (2013.01); *G06F 2203/011* (2013.01); *G10L 2015/0638* (2013.01); *G10L 2015/227* (2013.01)

(56) References Cited

U.S. PATENT DOCUMENTS

| | | | |
|---|---|---|---|
| 10,373,342 B1* | 8/2019 | Perez, III | G06F 3/011 |
| 11,145,100 B2 | 10/2021 | van Vuuren et al. | |
| 11,790,437 B1* | 10/2023 | Hazlewood | G06Q 30/0635 705/26.7 |
| 2008/0221892 A1 | 9/2008 | Nathan et al. | |
| 2009/0244071 A1 | 10/2009 | Kuo et al. | |
| 2010/0036717 A1 | 2/2010 | Trest | |
| 2011/0016004 A1 | 1/2011 | Loyall et al. | |
| 2014/0168124 A1 | 6/2014 | Park | |
| 2017/0068551 A1 | 3/2017 | Vadodaria | |
| 2017/0223092 A1 | 8/2017 | Subramanian | |
| 2017/0266812 A1 | 9/2017 | Thapliya | |
| 2018/0342095 A1 | 11/2018 | Walsh | |
| 2018/0343418 A1 | 11/2018 | Van Ness | |
| 2019/0147173 A1 | 5/2019 | Mai | |
| 2020/0279553 A1* | 9/2020 | McDuff | G10L 25/78 |
| 2021/0052967 A1* | 2/2021 | Putnam | A63B 24/0062 |
| 2021/0157844 A1* | 5/2021 | Andon | A63F 13/428 |
| 2021/0392762 A1* | 12/2021 | Shimoyama | G06F 1/1626 |
| 2022/0222880 A1 | 7/2022 | Bendale et al. | |
| 2022/0222883 A1 | 7/2022 | Bendale et al. | |
| 2022/0225486 A1 | 7/2022 | Mistry et al. | |
| 2022/0281117 A1* | 9/2022 | Eskandari | A61B 5/0022 |
| 2023/0274504 A1 | 8/2023 | Ren et al. | |

OTHER PUBLICATIONS

U.S. Appl. No. 17/571,099, Notice of Allowance; Sep. 14, 2023, 9 pg.
U.S. Appl. No. 17/571,106, Non-Final Office Action, Sep. 14, 2023, 11 pg.
U.S. Appl. No. 17/571,085, Non-Final Office Action, Dec. 9, 2023, 25 pg.
U.S. Appl. No. 17/571,106, Notice of Allowance; Jan. 10, 2024, 8 pg.
U.S. Appl. No. 17/571,099, Non-Final Office Action, Apr. 10, 2023, 35 pg.

* cited by examiner

| Service Status | DH and Device Status | | User Status | LED Lighting Effects | | |
|---|---|---|---|---|---|---|
| | DH Status | Device Status | | LED effect 1 | LED effect 2 | LED effect 3 |
| - | sleep | display off or DH idle | none | off | low brightness | |
| - | idle | DH idle | none | slow blinking (breathing effect) | slow cycle running | |
| - | waiting for next user | DH idle | none | iterating several LED slow patterns | slow blinking (breathing effect) | slow cycle running |
| Active idle | general greeting | | anonymous | audio volume gauging | cycle running | twinkling |
| Service Ready | user recognition | focus on user | watching DH | short twinkling | short blinking | |
| Service Ready | occupied | ready for service | watching DH | single color | | |
| Service Ready | | ready for service | listening | audio volume gauging | bright single color | |
| Recognition | specific greeting | human recognition processing | | fast cycle running | dual colors chasing | |
| Recognition | | accessing card or personal information | | fast cycle running | | |
| Recognition | | recognized | | single color | twinkling | swipe |
| | service guiding | show UI/UX | | slow cycle running | audio volume gauging | |
| | | connecting to cloud | | cycle running | | |
| Recognition | | recognition process success | | | | |
| | talking | | listening | | | |
| | listening | | talking | | | |
| | happy response | | | twinkling, blinking, sparkling | | |
| | sad response | | | colors fade in/out | | |
| | neutral response | | | single color | audio volume gauging | |
| | | power on | | fade in | running | strobe |
| | | power off (sleep down) | | fade out | | |
| ending service | goodbye | | goodbye | bouncing | fade out | sparkling |
| | event | | | sparkling | rainbow running | |
| | | ticket out | | meteor drop | | |
| | | upload user data | | meteor rise | | |

Determine an aspect of a user based on one or more
sensor-generated signals
2202

Determine a communicative lighting sequence based on the user attribute,
the communicative lighting sequence configured to communicate to the user
a condition of a digital human
2204

Generate the lighting sequence with an LED array on a digital
human display assembly
2206

FIG. 22

STRUCTURAL ASSEMBLY FOR DIGITAL HUMAN INTERACTIVE DISPLAY

CROSS-REFERENCE TO RELATED APPLICATIONS

This application claims the benefit of U.S. Provisional Patent Application No. 63/135,505 filed on Jan. 8, 2021, U.S. Provisional Patent Application No. 63/135,516 filed on Jan. 8, 2021, U.S. Provisional Patent Application No. 63/135,526 filed on Jan. 8, 2021, and U.S. Provisional Patent Application No. 63/135,855 filed on Jan. 11, 2021, each of which is incorporated herein by reference in its entirety.

TECHNICAL FIELD

This disclosure relates to computer-based applications, and more particularly, to interactive applications that use digital humans.

BACKGROUND

A digital human is a computer-generated entity that is rendered visually in a human-like appearance and that includes elements of artificial intelligence (AI) for interpreting user input and responding to the input in a contextually appropriate manner. The digital human can interact with an individual using verbal and/or non-verbal cues. Implementing natural language processing (NLP), a chatbot, and/or other software, the digital human can be configured to provide human-like interactions with the individual and/or perform activities such as scheduling, initiating, terminating, and/or monitoring of the operations of various systems and devices.

SUMMARY

In an example implementation, a digital human development method can include selecting a digital human. The method can include receiving user input specifying a dialogue for the digital human and one or more behaviors for the digital human corresponding with one or more portions of the dialog on a common timeline. The method can include generating scene data by merging the one or more behaviors with one or more portions of the dialogue based on times of the one or more behaviors and the one or more portions of the dialog on the common timeline.

In another example implementation, a system for developing a digital human can include one or more processors configured to initiate operations. The operations can include selecting a digital human. The operations can include receiving user input specifying a dialogue for the digital human and one or more behaviors for the digital human corresponding with one or more portions of the dialog on a common timeline. The operations can include generating scene data by merging the one or more behaviors with one or more portions of the dialogue based on times of the one or more behaviors and the one or more portions of the dialog on the common timeline.

In another example implementation, a computer program product includes one or more computer readable storage media, and program instructions collectively stored on the one or more computer readable storage media. The program instructions are executable by computer hardware to initiate operations. The operations can include selecting a digital human. The operations can include receiving user input specifying a dialogue for the digital human and one or more behaviors for the digital human corresponding with one or more portions of the dialog on a common timeline. The operations can include generating scene data by merging the one or more behaviors with one or more portions of the dialogue based on times of the one or more behaviors and the one or more portions of the dialog on the common timeline.

In another example implementation, a digital human interactive method can include determining a contextual response to a user input. The method can include generating a digital human and conveying with the digital human the contextual response to the user in real time. The digital human can be configured to convey the contextual response with a predetermined behavior corresponding to the contextual response.

In another example implementation, a system for generating an interactive digital human can include one or more processors configured to initiate operations. The operations can include determining a contextual response to a user input. The operations can include generating a digital human and conveying with the digital human the contextual response to the user in real time. The digital human can be configured to convey the contextual response with a predetermined behavior corresponding to the contextual response.

In another example implementation, a computer program product includes one or more computer readable storage media, and program instructions collectively stored on the one or more computer readable storage media. The program instructions are executable by computer hardware to initiate operations. The operations can include determining a contextual response to a user input. The operations can include generating a digital human and conveying with the digital human the contextual response to the user in real time. The digital human can be configured to convey the contextual response with a predetermined behavior corresponding to the contextual response.

In another example implementation, a digital human display assembly can include a rectangular display panel enclosed within a frame. The rectangular display panel can be configured to visually render a digital human during an interactive dialogue between the digital human and a user. A glass covering can be enclosed within the frame and extend over a front side of the rectangular display panel. A base can support the frame in an upright position. A light emitting diode (LED) arrangement can be positioned on one or more outer portions of the frame.

In another example implementation, a digital human display assembly can include a rectangular display panel for rendering a digital human and can include a rimless glass covering the display panel. A base can connect to a lower edge of the rectangular display panel and rimless glass covering to support the rectangular display panel and rimless glass covering in an upright position.

In another example implementation, a method can include positioning a digital human interactive display assembly. The method can include generating a digital human configured to engage in a dialogue with a user and displaying the digital human on the digital human interactive assembly.

In another example implementation, a method can include determining, with a communicative light system, an aspect of a user based on one or more sensor-generated signals. The method can include determining, with the communicative light system, a communicative lighting sequence based on the user attribute. The communicative lighting sequence can be configured to communicate to the user a condition of a digital human. The method can include generating the lighting sequence with an LED array on a digital human display assembly.

In another example implementation, a communicative light system can include one or more sensors, an LED array, a display, and one or more processors. The one or more processors can be configured to initiate operations to activate and control the LED array. The operations can include determining an aspect of a user based on one or more sensor-generated signals generated by the one or more sensors. The operations can include determining a communicative lighting sequence based on the user attribute, the communicative lighting sequence configured to communicate to the user the condition of the digital human displayed on the display. The operations can include generating the lighting sequence with the LED array on a digital human display assembly.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 19 describes certain example communicative lighting sequences generated by the communicative light system of FIG. 18.

FIG. 22 is a flowchart of an example method of digital human communication using a lighting sequence.

DETAILED DESCRIPTION

Figure 1:
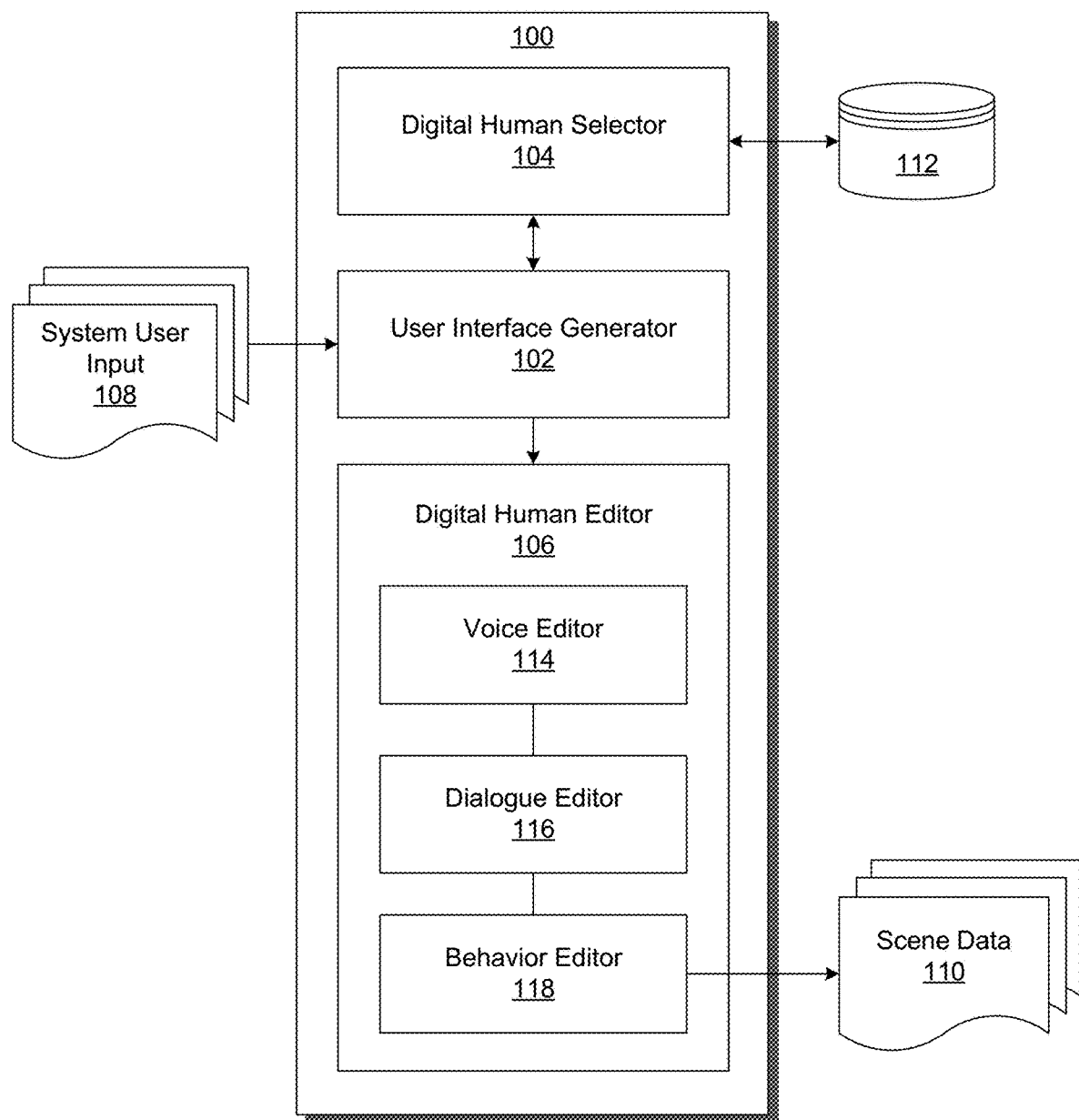
FIG. 1 illustrates an example digital human development platform.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to computer-based interactive applications, and more particularly, to interactive applications that use digital humans. In accordance with the inventive arrangements described herein, example methods, systems, and computer program products are provided that are capable of developing and rendering an interactive digital human having human-like attributes. As defined herein, "digital human" means is a computer-generated entity that in a visual rendering has a human-like appearance and includes, or is coupled to, an artificial intelligence (AI) for interpreting user input and responding to the input in a contextually appropriate manner. The AI can be accessed by the digital human via an API that connects to services either internal to the digital human or external to the digital human. The digital human is capable of interacting intelligently with a human user, developing a human-like memory, and displaying human-like behaviors, emotions, and personality.

One aspect of the inventive arrangements disclosed is a digital human development platform capable of generating a broadcast-ready digital human in response to and in accord with user specifications. The tool enables the user to specify a dialogue for the digital human to vocalize and behaviors for the digital human to display while engaged in the dialogue. As defined herein, "dialogue" means communication between a digital human and at least one actual human, in which the digital human communicates by voice, text, or gesture, regardless of whether an actual human communicates. In some scenarios, the dialogue is a two-way communication with, for example, the digital human answering or providing information in response to an actual human's query. Indeed, as disclosed herein, the digital human can engage in an interactive exchange or conversation with one or more actual humans. In other scenarios, the dialogue is a one-way dialogue or soliloquy, with the digital human providing instructions or information. In one aspect, the providing of information may be performed in response to detecting the presence of a human but without an express communication of the actual human. In each scenario, however, the digital human not only communicates in words but also in behavior, such as facial expressions, eye movements, and/or gestures that enhance the human-like quality of the dialogue.

The development tool enables the user to fine-tune movements, gestures, and facial expressions for the digital human to display while engaged in the dialogue. In contrast to conventional development tools, the inventive arrangements provide a unified platform combining capabilities for generating an interactive dialogue, digital human behaviors corresponding to the dialogue, and the background against which the digital human is visually rendered.

Another aspect of the inventive arrangements is a digital human interactive platform capable of generating the digital human, which in accordance with a user-specified dialogue, engages in an intelligent conversation (e.g., question-and-response dialogue) and displays behaviors (e.g., facial expressions, gestures) that mimic moods, emotions, and memory of an actual human.

Still another aspect is a digital human display assembly. In certain aspects, the digital human display assembly can provide a life-size image of the digital human. One or more sensors (e.g., camera, microphone, fingerprint reader, card reader) can be mounted to the digital human display assembly. The digital human may interact with an actual human based on sensor data generated by the sensor(s). A Light Emitting Diode (LED) array also can be connected to the digital human display assembly.

Yet another aspect is a communicative light system that activates and controls an LED array connected to the digital human display assembly. The communicative light system is capable of controlling the LED array to further communicate information to the actual human.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

Figure 23:
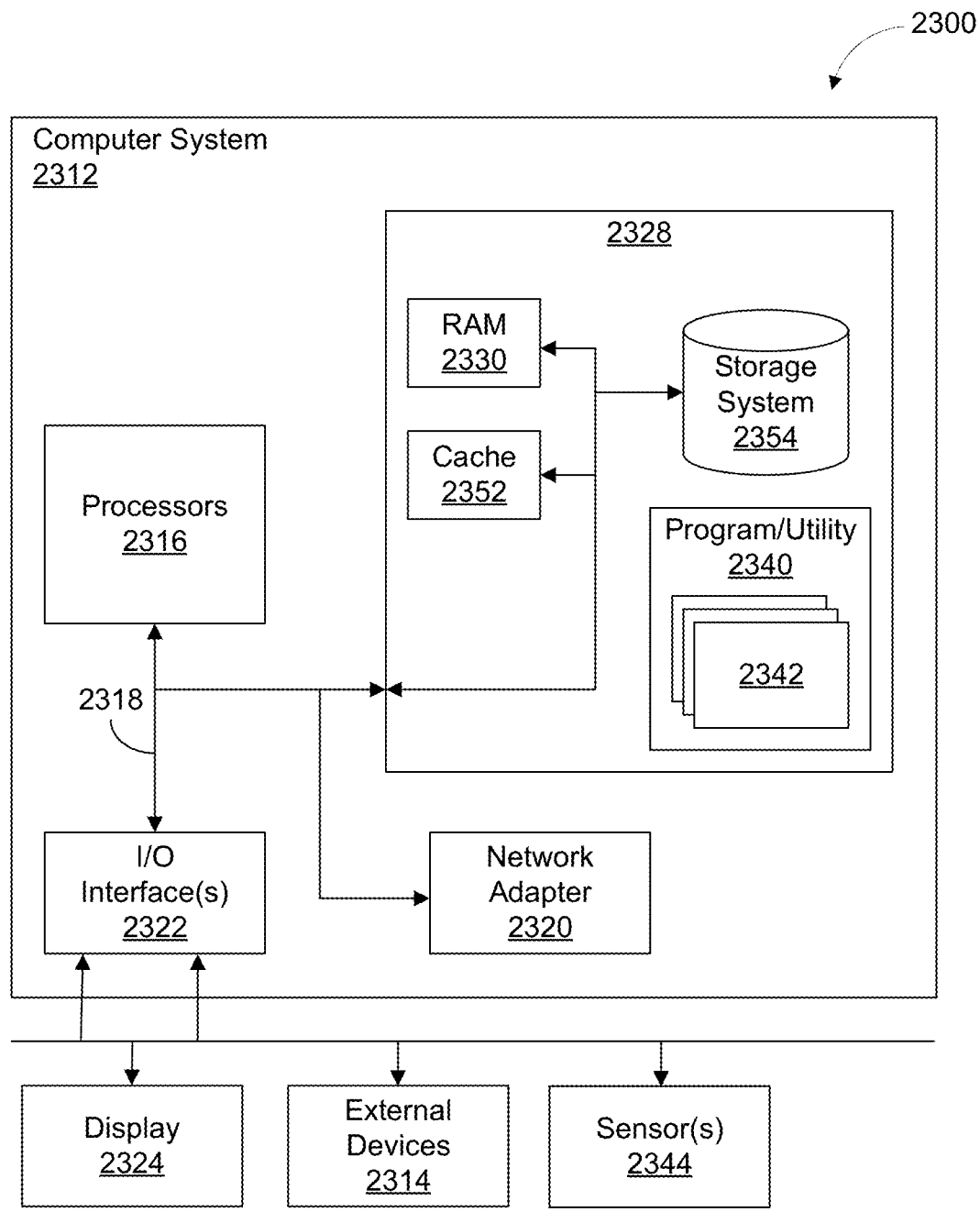
FIG. 23 illustrates an example computing node.

FIG. 1 illustrates example digital human development platform (DHDP) 100. Illustratively, DHDP 100 includes user interface generator 102, digital human selector 104, and digital human editor 106. User interface generator 102, digital human selector 104, and digital human editor 106 can each be implemented in hardware (e.g., dedicated hardwired circuitry), software (e.g., program code executed by one or more processors), or a combination thereof. For example, DHDP 100 in certain embodiments is implemented in a computing node, such as computing node 2300 (e.g., local or cloud-based server). Accordingly, in certain embodiments, DHDP 100 comprises program code that is electronically stored in a memory, such as memory 2328, and executes on one or more processors, such as processor(s) 2316 of computer system 2312 (FIG. 23).

DHDP 100, in response to system user input 108, is capable of generating scene data 110 that can be loaded on and executed by a separate device (e.g., local or cloud-based server). Executing scene data 110, the separate device visually and audibly presents a digital human on the display. The digital human engages in a dialogue with an individual who, positioned adjacent the display, interacts with the digital human.

Scene data 110, in some arrangements, comprise instructions that control the actions of the device having or operatively coupled with the display with which the digital human is visually and audibly presented. In other arrangements, scene data 110 comprise one or more audio-visual files that execute on the device. In each of the various arrangements, executing scene data 110 on the device enables the digital human to engage in the interactive dialogue with the individual adjacent the display on which the digital human is presented. The digital human vocalizes information, provides instructions, responds to queries, or otherwise interacts with the individual in the context of a specific dialogue. While engaged in the dialogue, the digital human expresses mood and emotion through voice inflections, facial expressions, bodily gestures, and the like—all of which are aptly suited for the specific context at each stage of the dialogue. The moods and emotions demonstrated by the digital human are responsive to the words and/or actions of the individual who engages in the dialogue with the digital human. The words and/or actions of the individual engaged in dialogue can be detected by a microphone and/or camera operatively coupled with the display on which the digital human appears. The digital human's spoken words and behavior, generated with the previously generated scene data 110, are responsive to the detected words and/or actions of the individual.

Scene data 110 is generated in response to, and based on, system user input 108 received by DHDP 100 via a user interface generated by user interface generator 102. In certain arrangements, user interface generator 102 generates a graphical user interface (GUI).

With digital human selector 104, the system user can select the digital human and set a resolution for the image of the digital human. The digital human selected can be chosen from multiple, preconfigured digital humans each having a distinct look, or visual appearance. The preconfigured digital humans can be electronically stored, for example, in database 112. Database 112, in some arrangements, is stored on the same device (e.g., computing node) in which DHDP 100 is implemented. In other arrangements, database 112 is stored on a separate device, such as a remote server (e.g., a cloud-based server).

Digital human editor 106 receives system user input 108 via the user interface generated by user interface generator 102. System user input 108 can specify a dialogue for the digital human, as well as one or more behaviors of the digital human corresponding with one or more portions of the dialog. Digital human editor 106 can align the dialogue and one or more behaviors corresponding to the one or more portions of dialog. Scene data 110 is generated by digital human editor 106 merging the one or more behaviors with one or more portions of the dialogue based on times of the one or more behaviors and the one or more portions of the dialog on a timeline.

Specific aspects of the dialogue and corresponding one or more behaviors can be generated based on system user input 108 to digital human editor 106. System user input 108 can specify attributes that contribute to the "look" and "mood," wherein the look is defined by facial features of the digital human and "mood" corresponds to the digital human's facial expressions.

In certain embodiments, digital human editor 106 includes voice editor 114, dialogue editor 116, and behavior editor 118. Voice editor 114 enables the user to select a voice type (e.g., sympathetic, stern, business) and/or tone.

Dialogue editor 116 enables the system user to specify specific words to be spoken by the digital human in response to one or more predetermined cues during an interactive dialogue with an individual. For example, in an airport scenario, the interactive dialogue may entail the digital human providing flight information to an individual in response to the individual specifying a desired destination. In a shopping scenario, for example, the dialogue may include the digital human recommending a particular type or brand of cosmetic in response to an individual's request for makeup information. In various other scenarios, the dialogue may comprise an instructional, informational, or other soliloquy type vocalization (e.g., a news presentation) solely by the digital human without either input or interaction with a viewing user who is watching and/or listening to the digital human.

Using dialogue editor 116, the system user is able to specify specific speech attributes of the digital human when speaking the dialogue. The speech attributes can include, for example, stress on certain words for emphasis, word inflections, tone of voice, and the like. The dialogue specified by system user input 108 is aligned on a timeline by digital human editor 106. Dialogue editor 116 enables the user to specify, based on the timeline, the duration and speed of the dialogue.

Optionally, dialogue editor 116 can enable the user to select one of a plurality of different languages for the digital human to speak. DHDP 100 can include a translator (not explicitly shown) that translates user input (text and/or voice-to-text) in one language to another language.

Behavior editor 118 enables the system user to specify the behaviors in which the digital human engages while vocalizing the dialogue and/or at other times when not engaged in dialog (e.g., while awaiting input from a user). Behaviors can include, for example, movements of the digital human's mouth (e.g., smile, frown, moving in coordination with speaking), eyes (e.g., looking up, down, left, right, or forward), head (e.g., turning, tilting to the side), and/or hand gestures. The facial features of the digital human can include, for example, a pleasant smile when conveying a greeting, a furrowed brow connoting concern or intense interest when receiving information from an individual, a wide-eyed look to denote surprise, or other expression given a particular interaction with the individual. In different arrangements, each distinct behavior can be implemented by preconstructed animated video of the behavior and/or computer-executable instructions (software code) that executes on a computer system integrated in or operatively coupled with the display that presents the digital human.

Figure 2A:
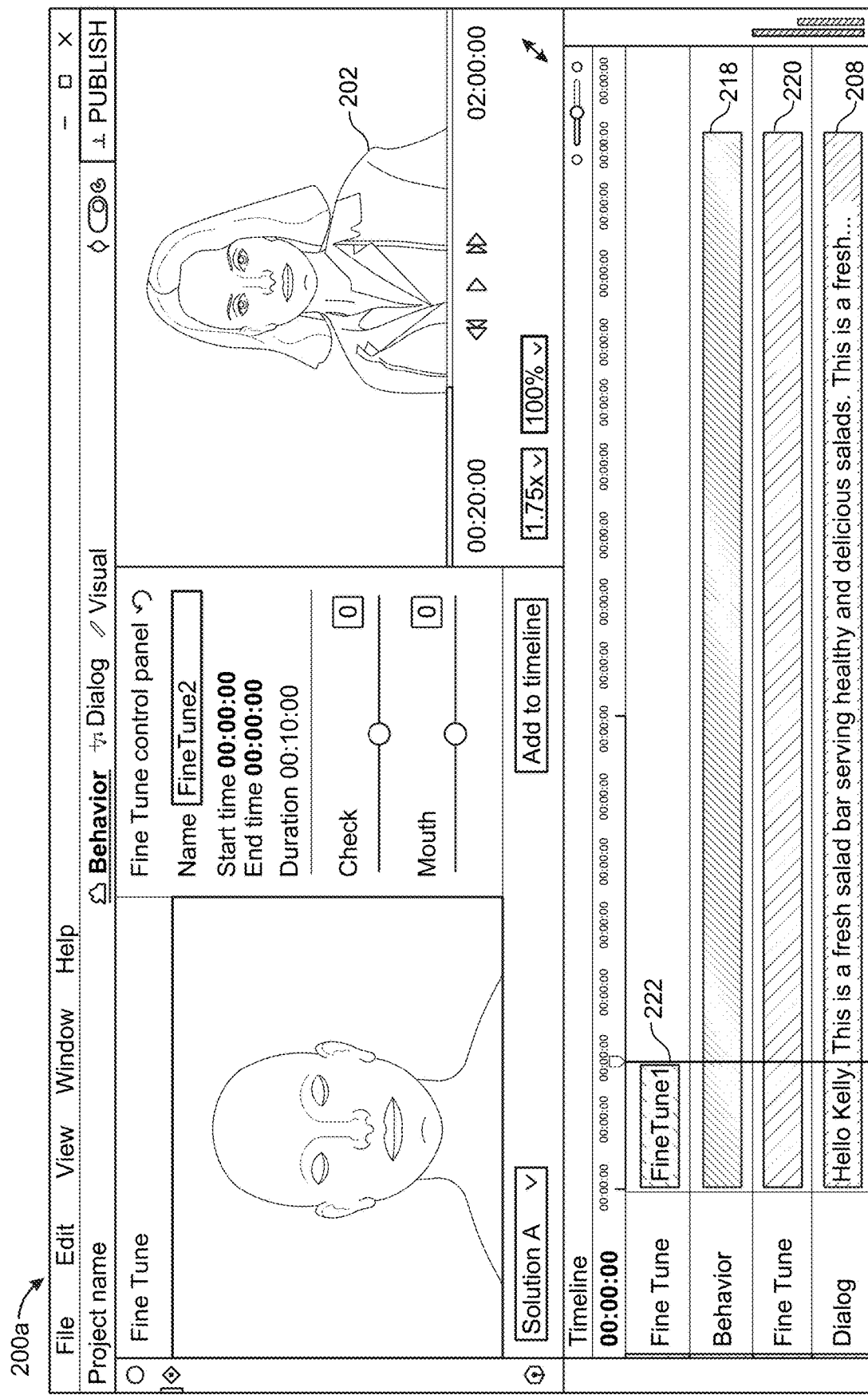
FIGS. 2A-2D illustrate certain operative aspects of the digital human development platform of FIG. 1.
Figure 2B:
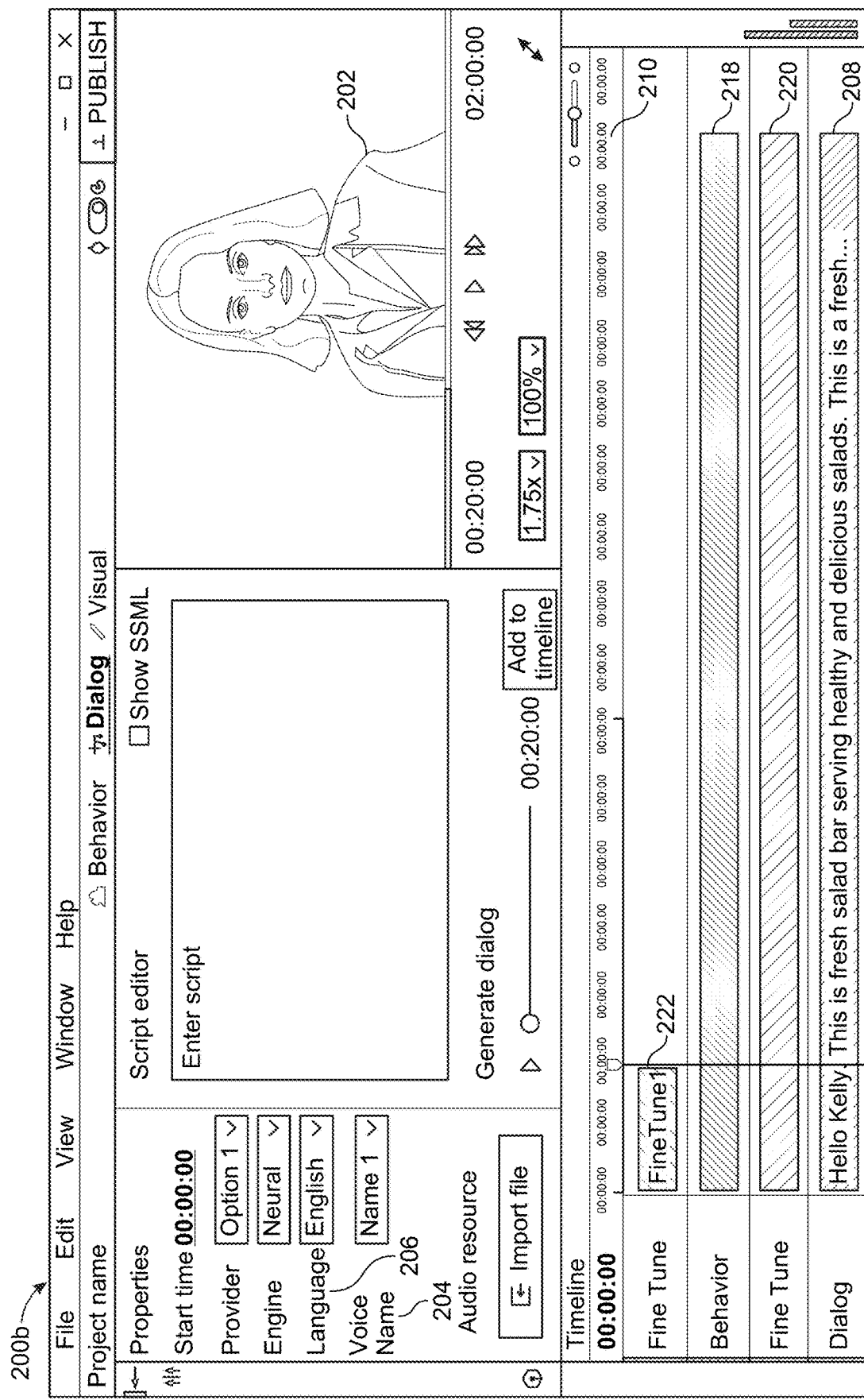
Figure 2C:
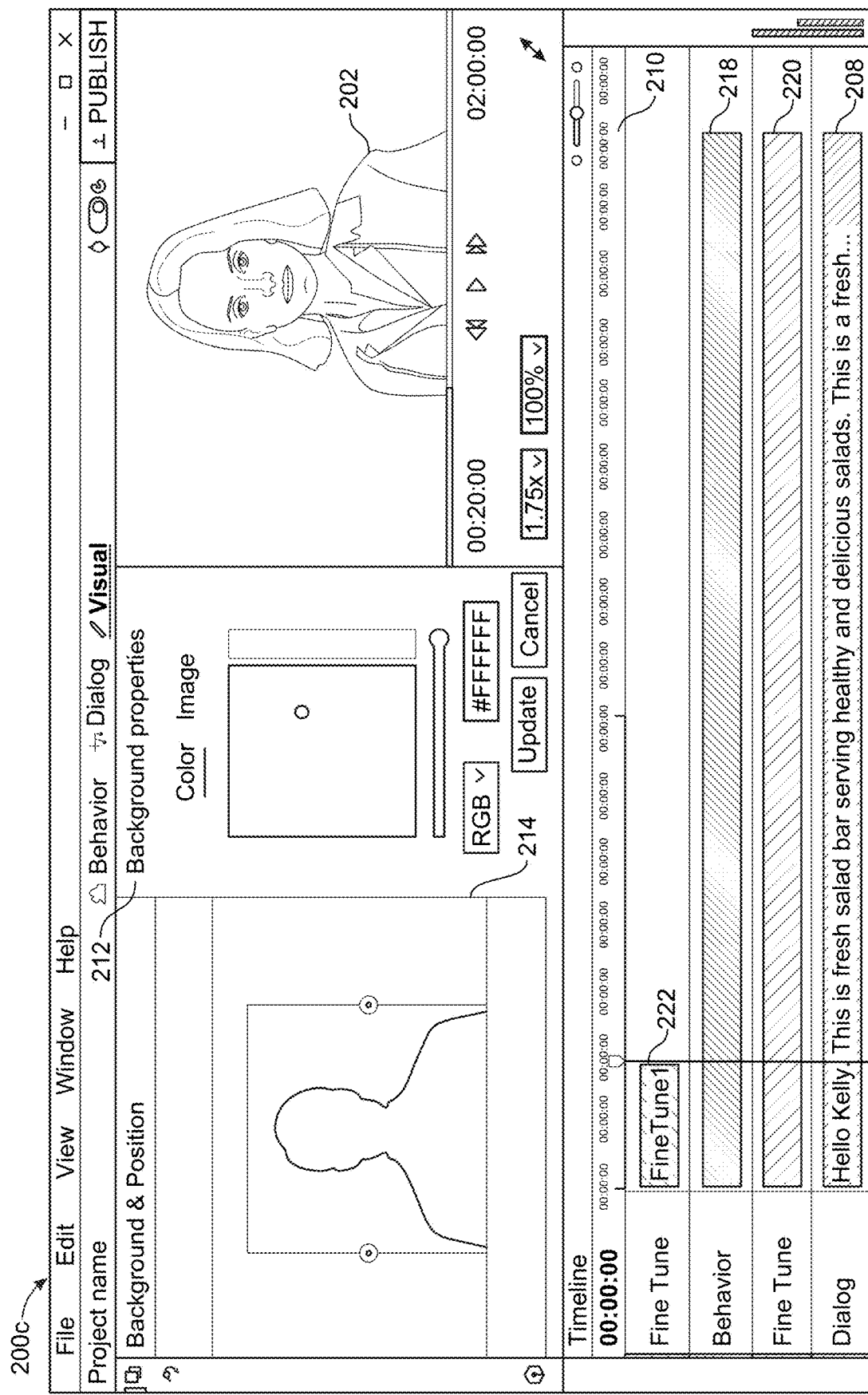
Figure 2D:
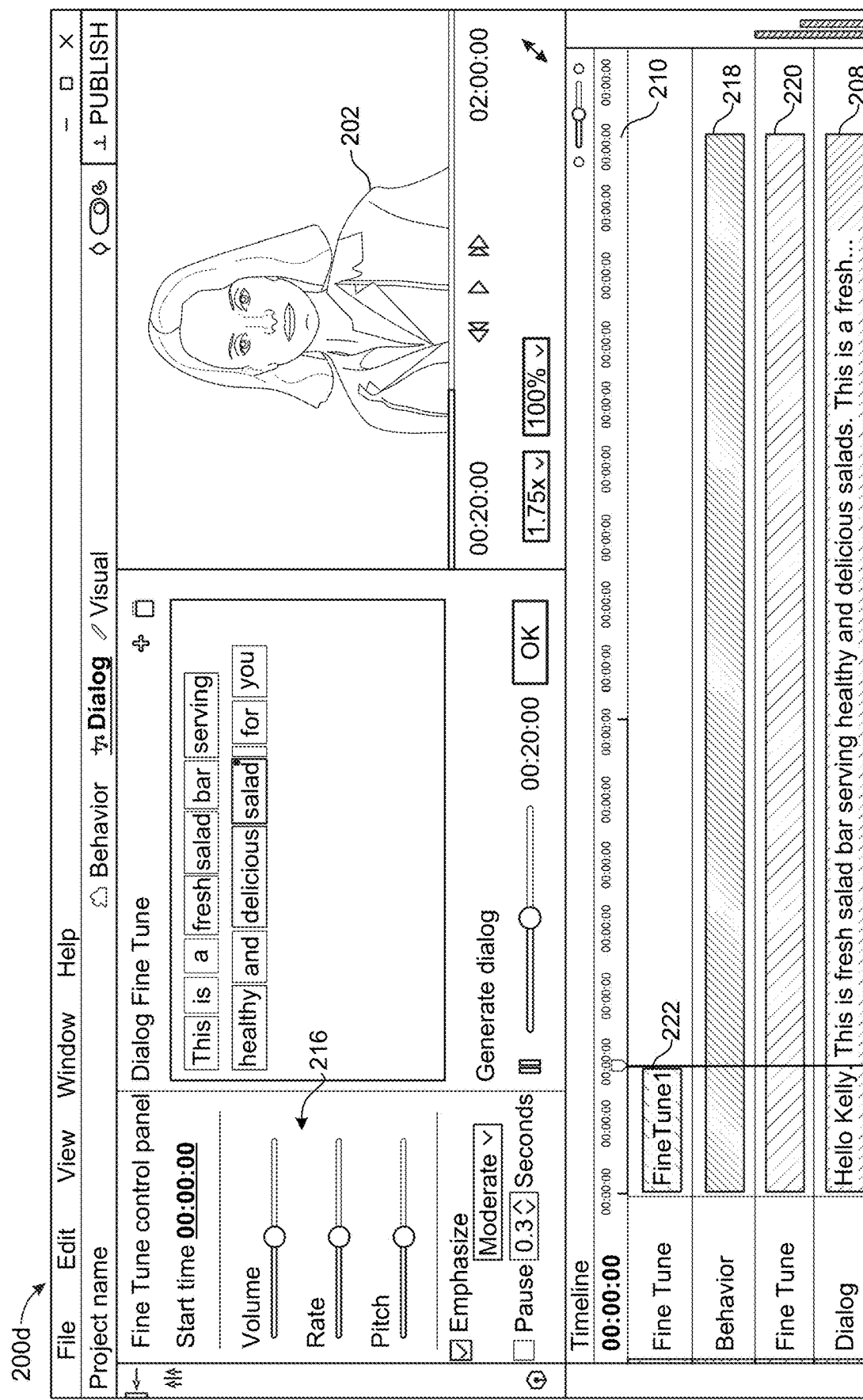

FIGS. 2A-2D illustrate certain operative aspects of DHDP 100. FIG. 2A illustrates example GUI 200a generated by user interface generator 102. The system user selects digital human 202 and sets the resolution. With example GUI 200b illustrated in FIG. 2B, system user input specifying a voice for digital human 202 is received in GUI element 204 and input specifying the language spoken by digital human 202 is received in GUI element 206. Additional input (text and/or speech-to-text) of the system user specifies dialogue, which appears on dialogue track 208. Digital human editor 106 aligns dialogue track 208 on timeline 210. FIG. 2C illustrates optional GUI 200c with which the system user provides input to GUI element 212 to specify a color and/or other aspects of a background for digital human 202 and GUI element 214 to position digital human 202 against the specified background. The background may be a solid color as selected or an image, for example. System user input to GUI element 212, for example, can specify colors, objects, and the like, as well as select an image. With example GUI 200d illustrated in FIG. 2D, the system user edits the dialogue presented graphically by entering input using controls 216. The system user can edit the dialogue to provide one or more inflections, a stress on one or more words, one or more speech rates, and/or one or more voice tones in rendering (e.g., on a display) the dialogue by the digital human.

In addition to dialogue track 208, GUIs 200a, 200b, 200c, and 200d also include behavior track 218, which enables the system user to track user-specified behaviors (described below) on timeline 210, which is common to both the dialogue track 208 and behavior track 218. Fine tuning track 220 enables the system user to fine tune the user-specified dialogue on dialogue track 208. Fine tuning track 222 enables the system user to fine tune (also described below) the user-specified behaviors on behavior track 218. Aligning the dialogue and one or more corresponding behaviors to common timeline 210 enables the system user to visualize the overlap between the two, essentially allowing the system user to see what behavior the digital human performs as the digital human vocalizes specific portions of the dialogue. The alignment further enables the system user to fine tune the digital human's behaviors with words spoken so that each word has just the right emphasis or inflection, and so that each word spoken occurs with just the right tone, emotion, gesture, facial expression, and/or eye movement.

In one or more examples, the system user may initiate playback of the digital human to audition the dialog rendering in combination with the specified behaviors. The digital human may vocalize the dialog in combination with animating the behaviors in the window displayed within the example GUIs while a play head advances through the timeline showing the exact position in time on the timeline during the auditioning or playback of the dialog and behaviors by the digital human.

Figure 3A:
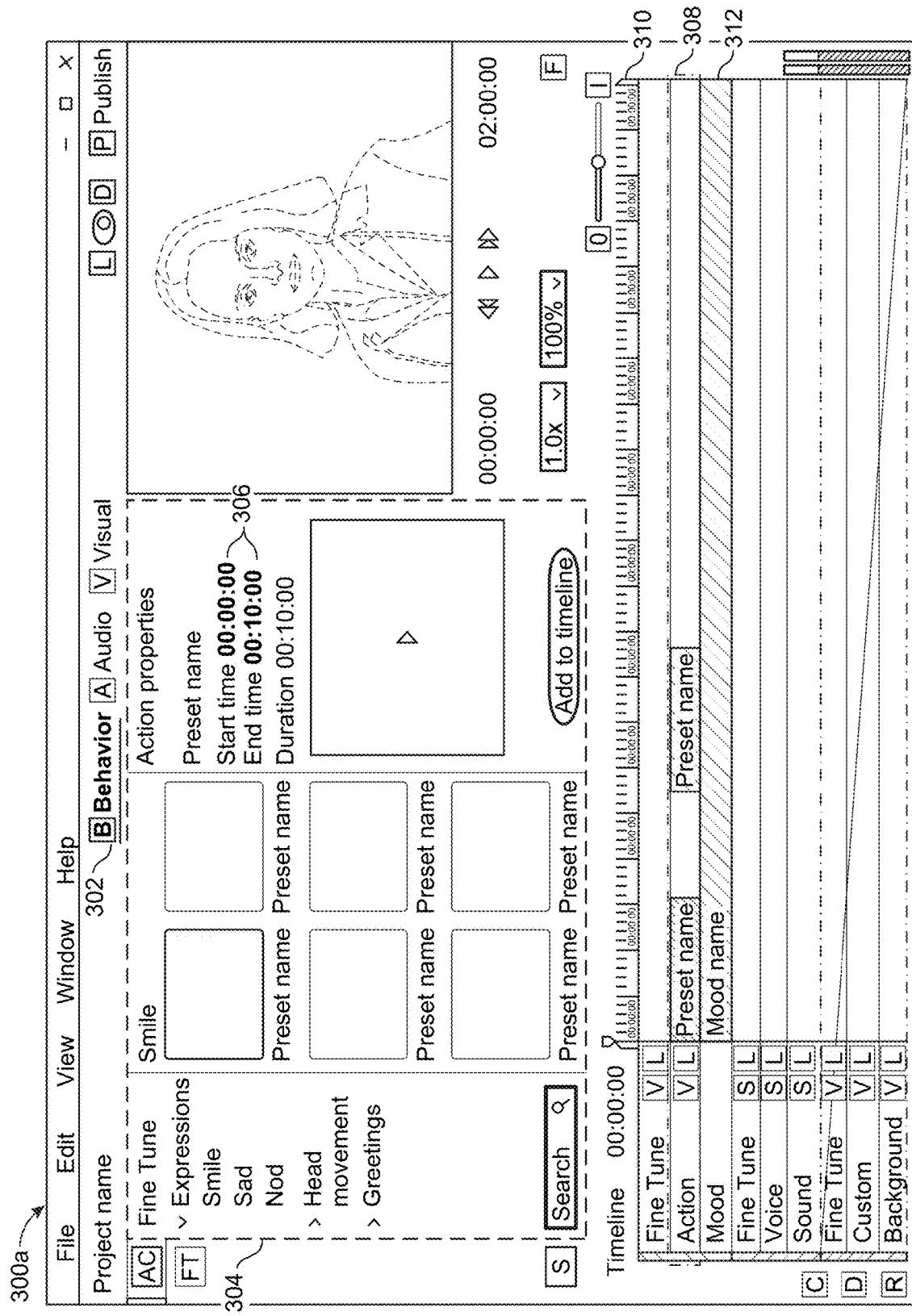
FIGS. 3A and 3B illustrate certain operative aspects of the digital human development platform of FIG. 1.
Figure 3B:
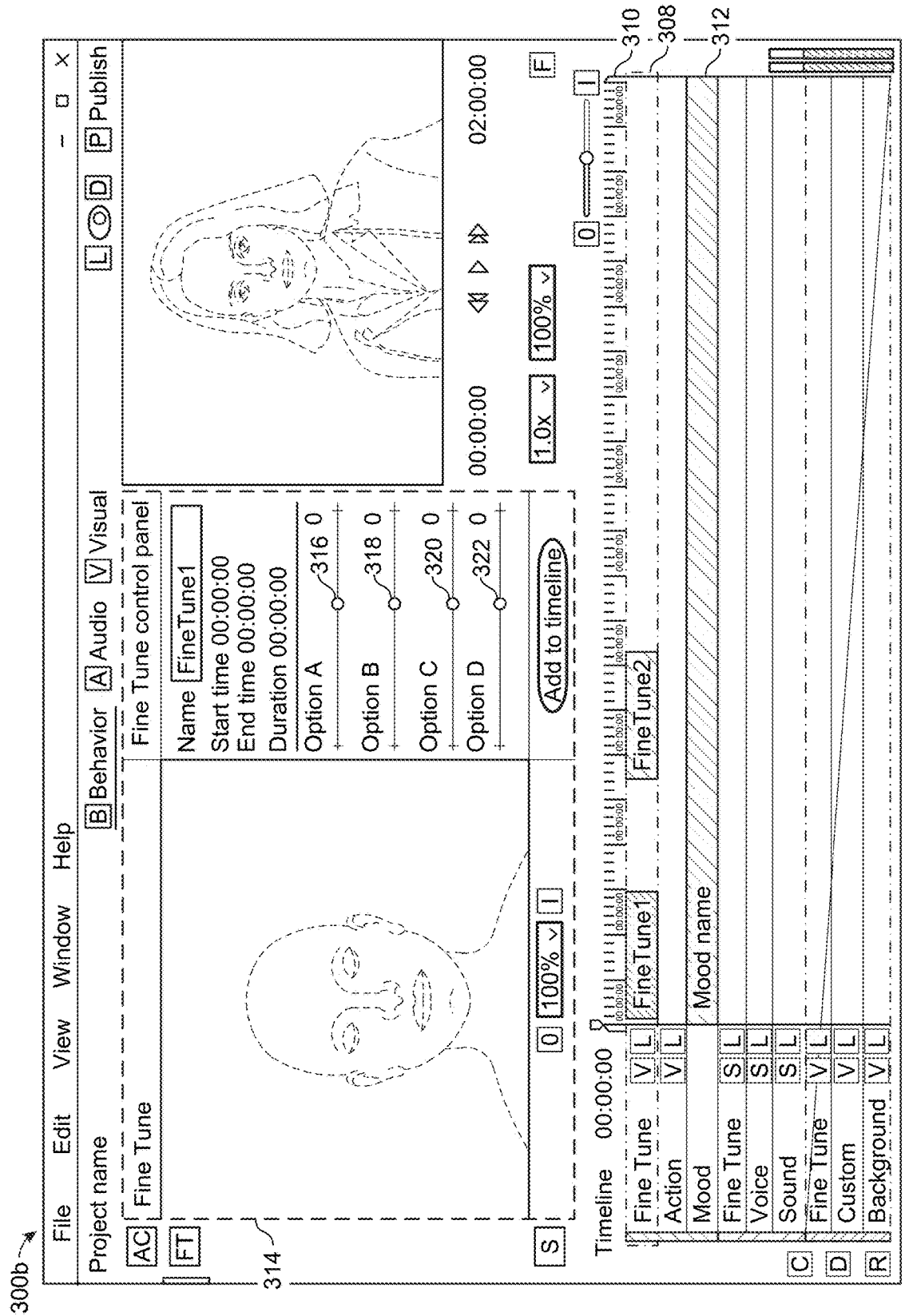

FIGS. 3A and 3B illustrate certain operative aspects of DHDP 100 specifically pertaining to specifying the behaviors of the digital human. Example GUI 300a illustrated in FIG. 3A is generated by user interface generator 102. GUI 300a enables the user to specify one or more behaviors, illustratively including facial expressions and movements. In response to the system user selecting "B" (Behavior) 302, for example, DHDP 100 presents the user with options for specifying actions corresponding to a dialogue. Illustratively, the system user may specify facial expressions (e.g., smile), mood (e.g., sad), and/or movement (e.g., nod), such as head movement using the GUI elements presented in action box 304. Thus, by selecting options from action box 304 of GUI 300a, the system user can specify behaviors that are to be exhibited by the digital human during the dialogue. The user can choose a specific action for the digital human to perform a certain behavior, set a time for the behavior's performance during the dialogue, and add the selected action to the timeline common to the timeline with which the dialogue is aligned. Thus, the system user can specify the timing for the digital human to engage in the behavior during the corresponding dialogue by entering time-based data 306 corresponding to specific behaviors. Digital human editor 106 aligns one or more user-specified behaviors on behavior/action track 308, as specified, with timeline 310, which is common with the timeline with which the vocalization of dialogue is aligned and corresponds to a mood specified for track 312.

FIG. 3B illustrates the system user's ability to fine tune the selected behavior(s) using example GUI 300b. Supplying input to fine tuner 314, the system user can modify different aspects of the selected behaviors, emphasizing some relative to others and modifying still others. Illustratively, fine tuner 314 provides the system user with option A, option B, option C, and option D. By moving slidable controller 316, for example, the system user can specify attributes of a smile of the digital human on a continuum from slight to wide. By moving slidable controller 318, for example, the system user can specify head movement by the digital human on a continuum from a vigorous up and down movement of agreement or affirmation to a non-comital nod. By moving slidable controller 320, the system user can specify a hand movement by the digital human on a continuum from a sweeping gesture urging an individual to approach the display on which the digital human is displayed to a slight upward raising to urge the individual to stop speaking, for example. By moving slidable controller 322, the system user can specify eye eye movements of the digital human, such that the digital human looks directly at a speaker when engaging in a face-to-face dialogue with an individual, looks left and right while waiting for a response from the individual, or somewhere in between.

FIGS. 4A-4D illustrate certain editing functions performed by digital human editor 106, according to certain arrangements. Digital human editor 106 aligns the dialogue for the digital human and one or more behaviors for the digital human corresponding with one or more portions of the dialog on a common timeline. The functions performed by digital human editor 106, according to certain arrangements, enable the system user to cut, duplicate, and remove segments of both dialogue and behaviors. Each of the functions can be performed independently on the dialogue and one or more behaviors. Illustratively, the functions are performed using GUIs generated by user interface generator 102.

Figure 4A:
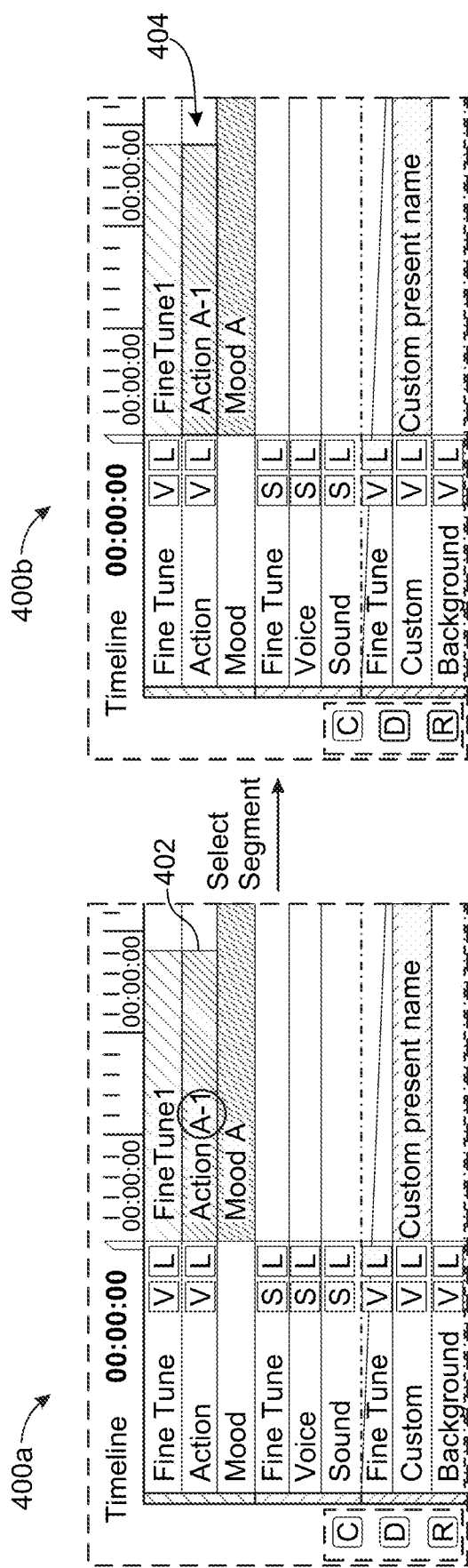
FIGS. 4A-4D illustrate certain operative aspects of the digital human development platform of FIG. 1.
Figure 4B:
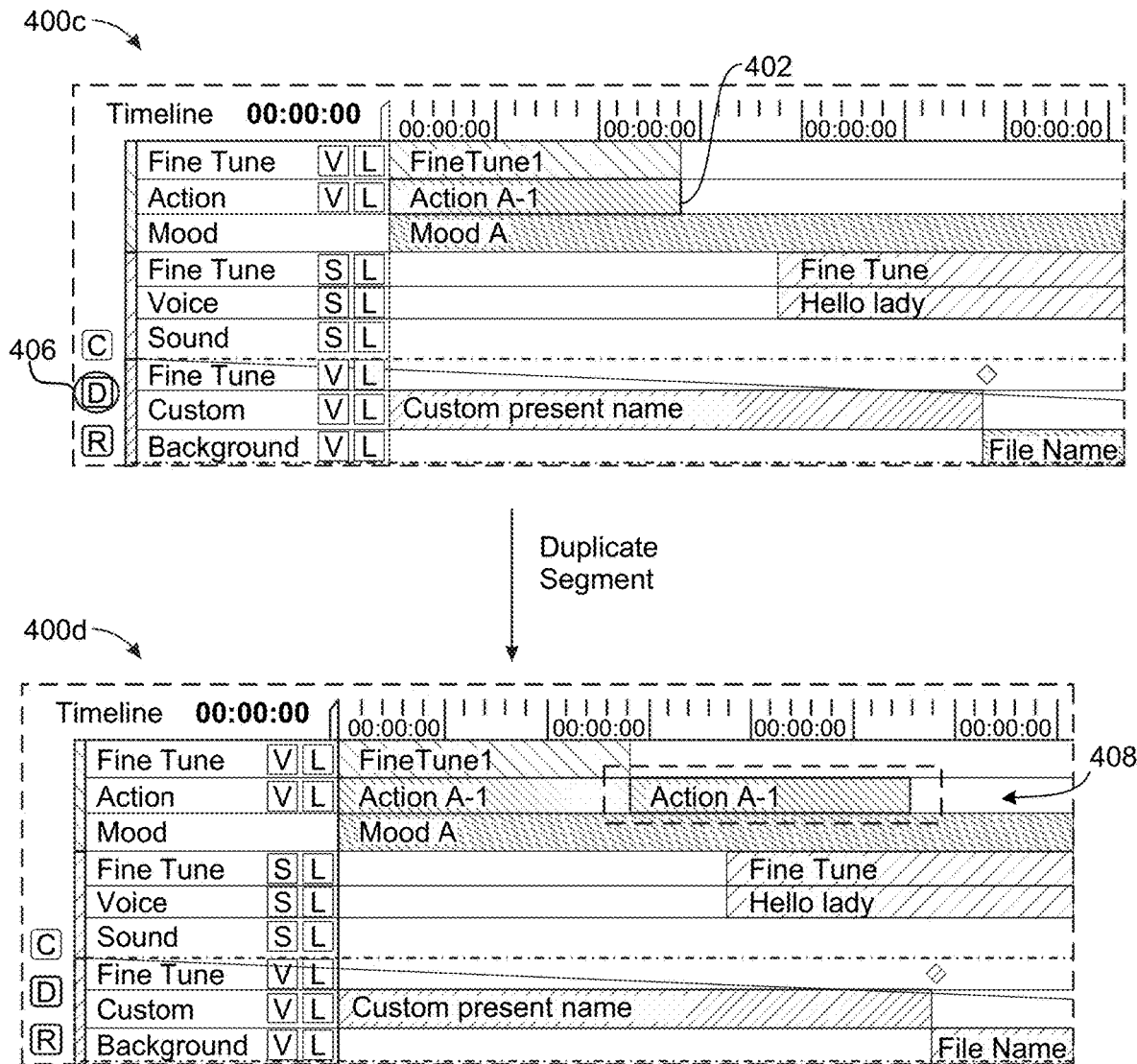
Figure 4C:
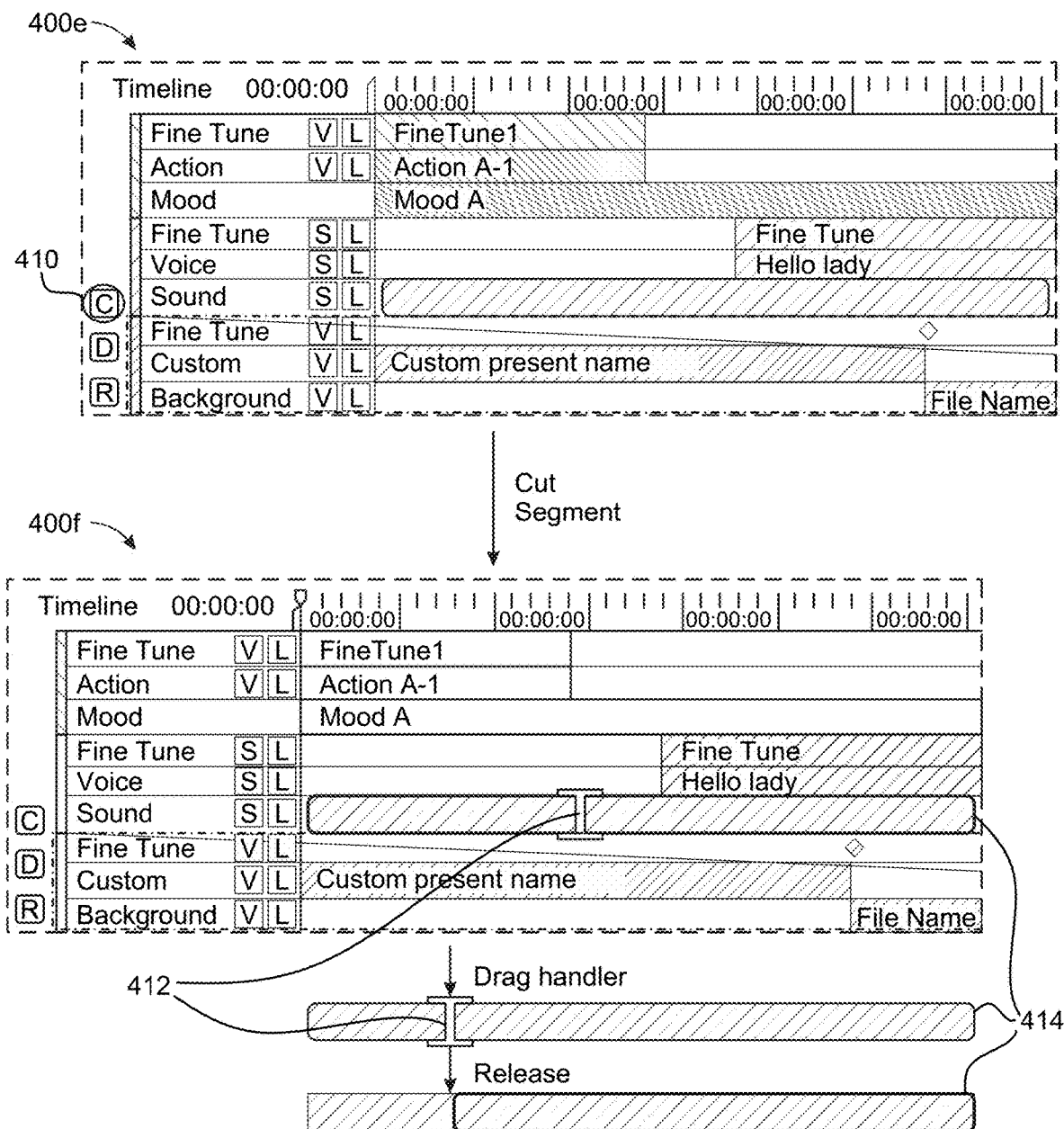
Figure 4D:
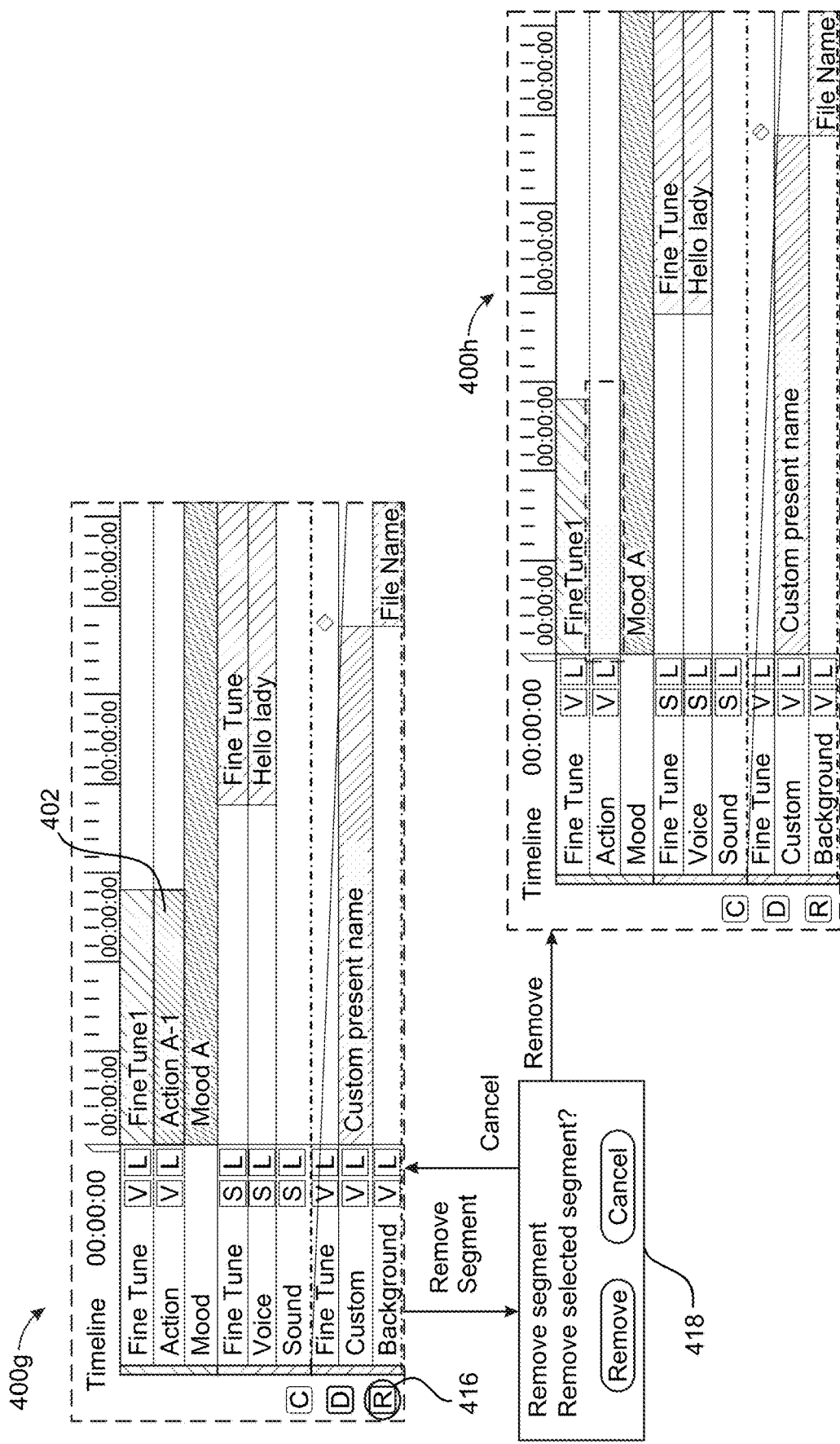

FIG. 4A illustrates example GUI 400a with which the system user selects action 402 from among multiple behaviors, the selected action being shown as part of behaviors 404 of GUI 400b that are being constructed for a corresponding dialogue. FIG. 4B illustrates duplicating action 402 using the duplicate function which the user selects with button 406 presented on GUI 400c. The duplicate function repeats action 402, as shown by GUI 400d. The duplicated action is placed in the same track as the selected action 402 and abuts action 402. FIG. 4C illustrates the split function of a portion of dialogue by the system user's selecting button 410 presented on example GUI 400e. Illustratively, the cut function automatically provides the system user with drag handler 412 with example GUI 400f. The system uses drag handler 412 to visually grab dialogue portion 414. Using drag handler 412, the system user splits dialogue portion 414 from the rest of the dialogue with a drag and release operation, thereby allowing each of the resulting segments of dialog portion 414 to be further processed (e.g., via fine tuning and/or relocation on the timeline) independently of one another as separate dialog portions. FIG. 4D illustrates the remove function of digital human editor 106. With example GUI 400g, the system user selects button 416, which brings up option 418 to remove a segment of dialogue or behavior. Illustratively, selected action 402 is removed by the system user's choosing the remove option, as shown by example GUI 400h. The system user can also split a portion of dialogue into two separate portions and modify the dialogue by inserting newly added dialogue between the separated portions.

Figure 5:
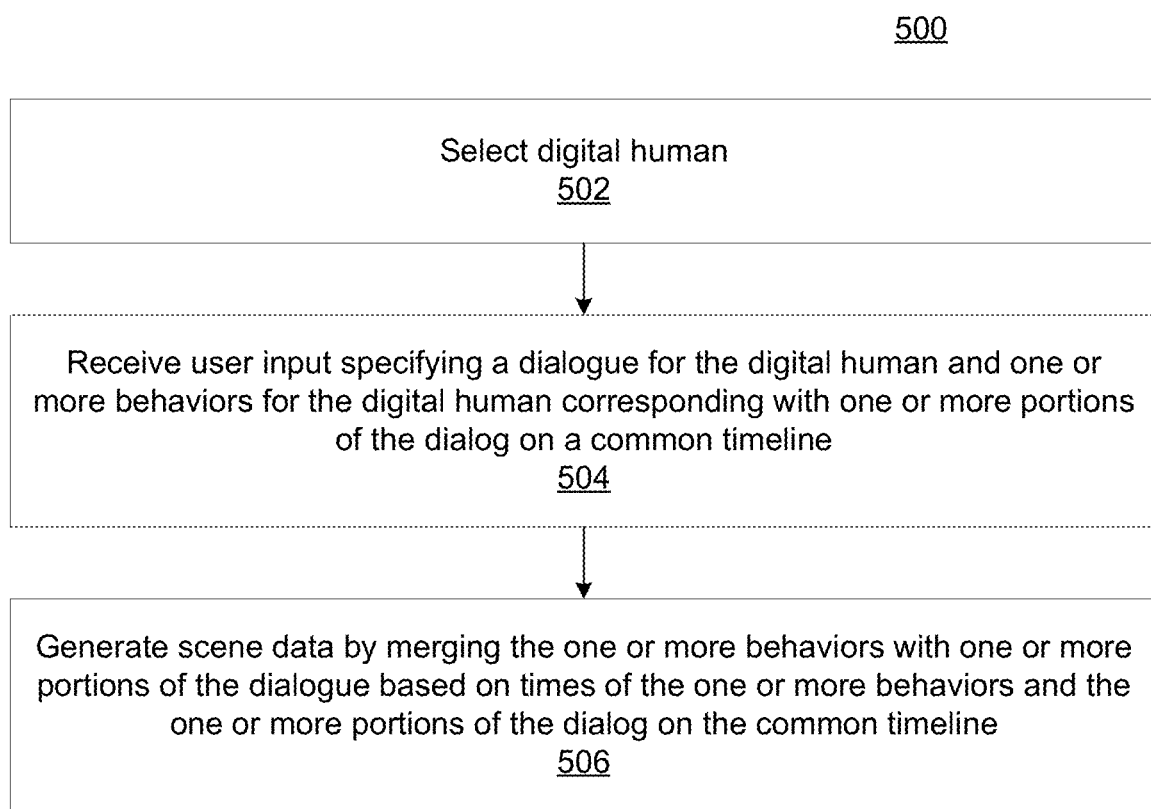
FIG. 5 is a flowchart of an example method of developing a digital human and one or more interactive dialogues for the digital human.

FIG. 5 illustrates an example method 500 of generating computer-executable instructions for presenting a digital human on a display, the digital human capable of engaging in a user-specified interactive dialogue and exhibiting user-specified behaviors. Method 500 can be performed by a computing node that implements the digital human development platform as described herein in connection with FIG. 1 (collectively "the system").

At block 502, the system enables a system user to select a digital human. The system, at block 504, can receive user input specifying a dialogue for the digital human and one or more behaviors for the digital human. The one or more behaviors correspond with one or more portions of the dialog on a common timeline. At block 506, the system can generate scene data by merging the one or more behaviors with one or more portions of the dialogue based on times of the one or more behaviors and the one or more portions of the dialog on the common timeline.

The system, in certain embodiments, enables the system user to select a visual representation of the digital human from a plurality of visual representations corresponding to different digital humans electronically stored in a database communicatively coupled with the system. In certain arrangements, different digital humans can be electronically stored on a remote server or other computing node communicatively coupled (e.g., via a data communications network) with the system. Optionally, the system also can enable the system user to select a voice type corresponding to the digital human for audibly rendering the dialogue specified by the system user input.

The system also optionally can enable the system user to select a language corresponding to the digital human for audibly rendering the dialogue on a display device. The system, moreover, can include a translator to automatically convert the dialogue into the selected language in the event that the dialogue based on system user input is in a different language than that selected.

In certain embodiments, the merging performed with the system comprises determining individual time segments of the timeline, during which distinct portions of the dialogue are rendered, and editing at least one of the one or more behaviors within each of the individual time segments. The one or more behaviors can include one or more facial expressions rendered by the digital human. Each facial expression may be timed based on the timeline to correspond to a time interval during which a select portion of the dialogue occurs or an absence of dialogue between two consecutive portions of the dialogue occurs. The one or more behaviors additionally, or alternatively, can include one or more gestures made by the digital human, each gesture corresponding to a select portion of the dialogue or an absence of dialogue between two consecutive portions of the dialogue.

In certain embodiments, the system enables the system user to edit the dialogue. The editing can modify words, phrases, and the like according to the system user's specification. The editing can provide an inflection, a stress, a speech rate, and/or a tone of one or more words of the dialogue. In certain other embodiments, the system in response to system user input can generate a background against which the digital human appears when visually rendered on a display. The system can, in response to system user input, position the digital human against the background when the digital human is presented on the display.

Figure 6:
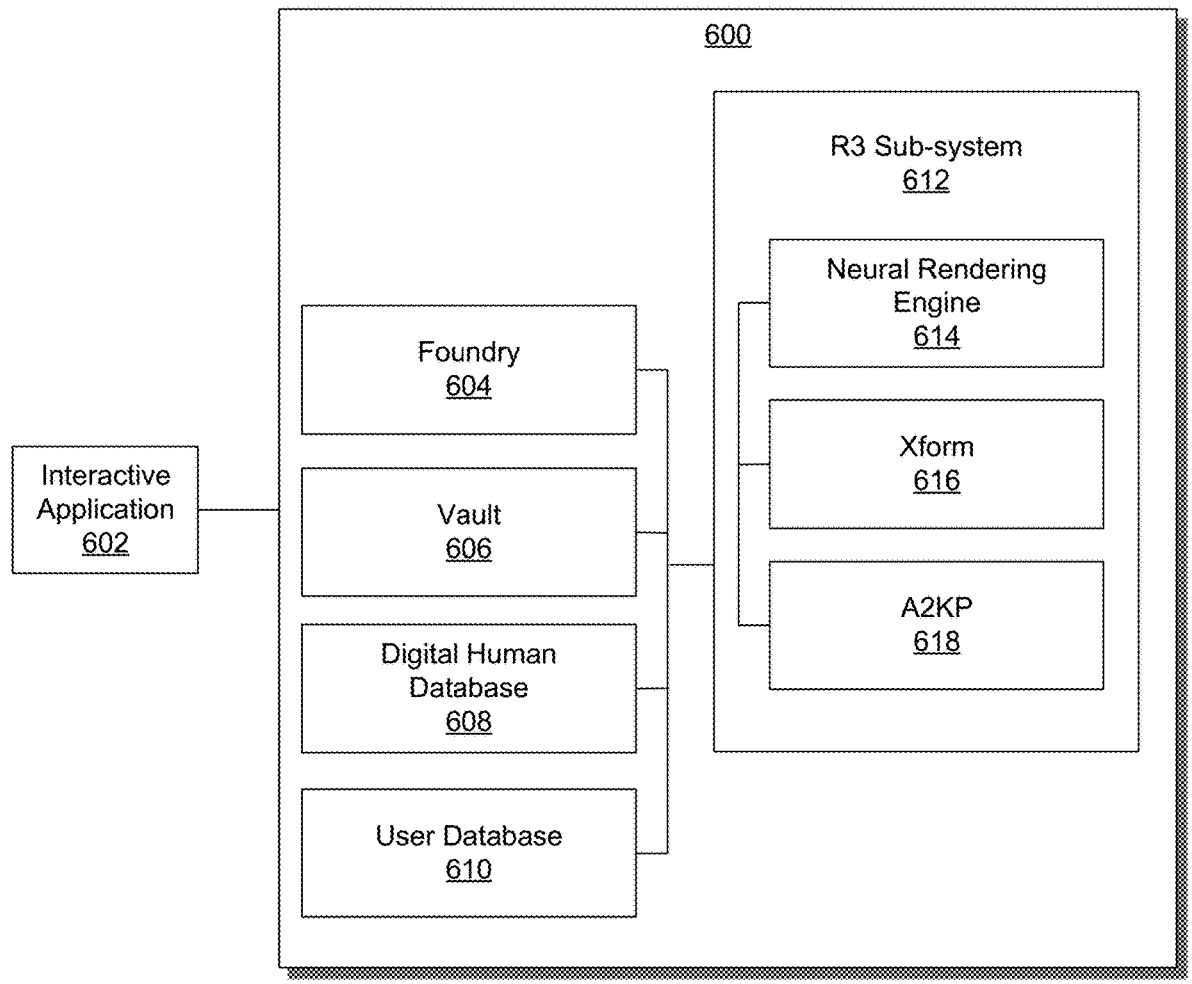
FIG. 6 illustrates an example digital human interactive platform.

FIG. 6 illustrates example digital human interaction platform (DHIP) 600. DHIP 600 is capable of facilitating an interactive dialogue between the digital human and a user. The digital human and interactive dialogue can be generated in accordance with scene data 110 generated by DHDP 100 as described above. The dialogue can be structured as a sequence of one or more inputs, each of which automatically elicits a digital human response according to scene data 110. The user input to DHIP 600 can comprise voice, text, and/or movement of the user who interacts with the digital human. The response of the digital human can comprise voice and/or text accompanied by one or more behaviors (e.g., facial expression, eye movement, gesture) of the digital human, as also described above.

Figure 24:
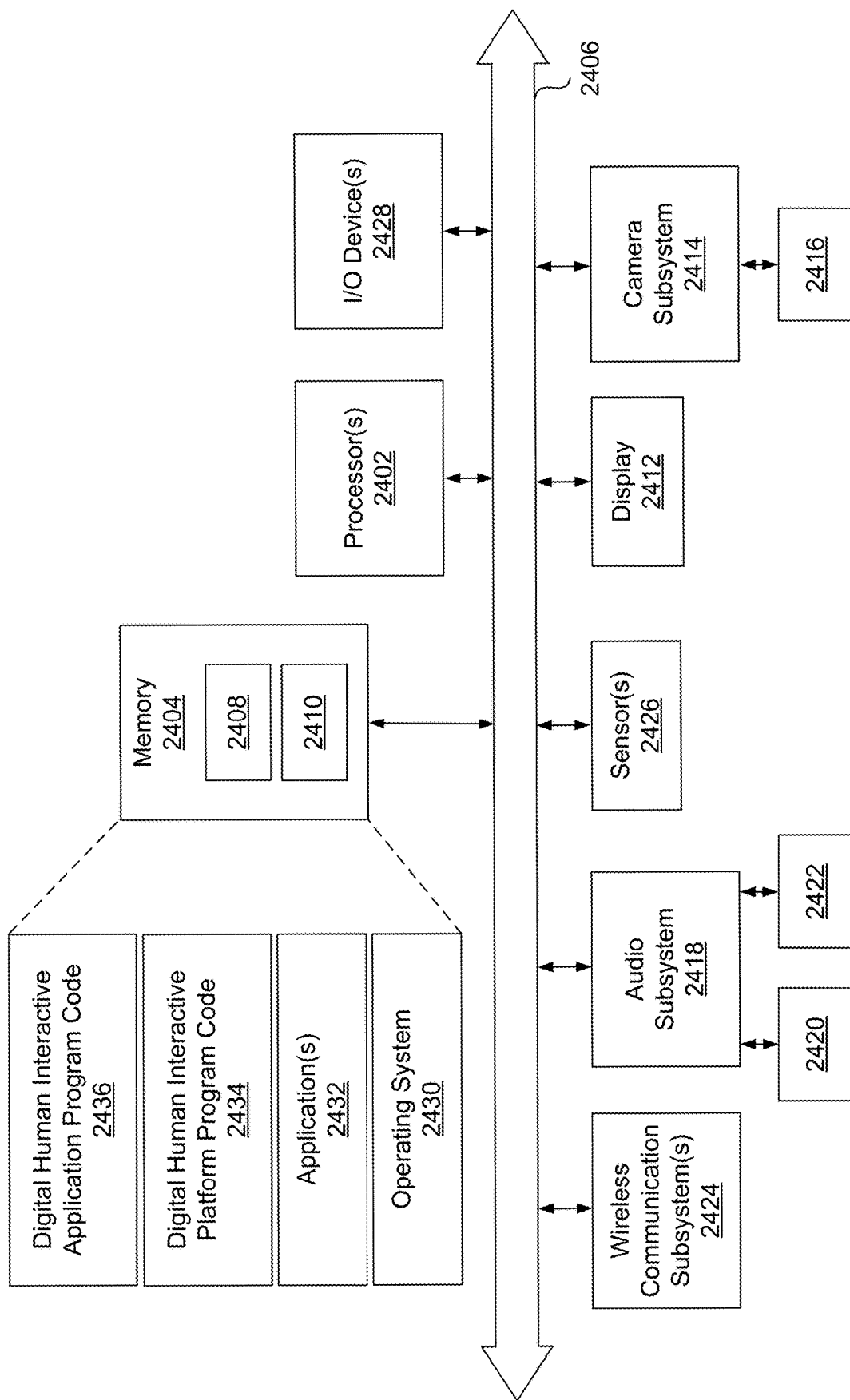
FIG. 24 illustrates an example electronic device.

Illustratively, DHIP 600 includes interactive application 602, foundry 604, vault 606, digital human database 608, user database 610, and real-time reality-based response (R3) sub-system 612. Foundry 604, vault 606, digital human database 608, user database 610, and R3 sub-system 612 can each be implemented in hardware (e.g., dedicated hardwired circuitry), software (e.g., program code executed by one or more processors), or a combination thereof. For example, DHIP 600 in certain embodiments is implemented in a device, such as device 2400. Accordingly, in certain embodiments, DHIP 600 comprises program code that is electronically stored in a memory, such as memory 2404, and executes on one or more processors, such as processor(s) 2402 of device 2400 (FIG. 24).

Interactive application 602 comprises a front end of DHIP 600. Supported by the other elements of DHIP 600—foundry 604, vault 606, digital human database 608, user database 610, and R3 sub-system 612—interactive application 602 is the vehicle or interface via which the digital human generated by DHIP 600 interacts with a human individual, the user. Thus, the user sees, hears, and speaks with the digital human through interactive application 602. In various arrangements, interactive application 602 is integrated with the other elements of DHIP 600 in the same device, such as a kiosk display, computer (e.g., desktop, laptop), or mobile device (e.g., smartphone). In other arrangements, interactive application 602 can be implemented, for example, in Java Script, HTML, or other platform-agnostic software that executes on a display kiosk, computer, smartphone, or other device which operatively couples with a local, remote, or cloud-based server in which foundry 604, vault 606, digital human database 608, user database 610, and R3 sub-system 612 are implemented.

Foundry 604 electronically stores data, such as machine-executable instructions and/or video files, corresponding to attributes described above pertaining to the digital human. Thus, attributes of the digital human generated with data electronically stored in foundry 604 can include the digital human's facial features, mood, tone of voice, language, and the like. Vault 606 electronically stores related meta-data pertaining to the digital human. Digital human database 608 provides a list or menu of different digital humans available for engaging in an interactive dialogue. User database 610 electronically stores data specific to a user that engages in a dialogue with the digital human. As described in greater detail below, user data electronically stored in user database 610 can include, for example, certain user preferences and/or information that the digital human references during an on-going dialogue or in separate dialogues at different times.

In certain arrangements, user data can be data that relates to a one-time interaction between the user and the digital human. An example one-time interaction is a scenario in which the user approaches a kiosk capable of displaying the digital human agent, which is configured to respond to a user request for information. The information request, for example, can be a request for flight information if the digital human is displayed on an airport kiosk. For example, the information request can be a request for information concerning a product if the digital human is displayed on or adjacent a product counter. User database can cache information as the dialogue proceeds. For example, in a scenario described below in which the digital human engages with the user in a dialogue concerning makeup, the digital human asks what the user's skin tone is. The user's response is cached in user database 610 and referenced by the digital human as the dialogue proceeds as the digital human describes different aspects of different products suited to the user's specific skin tone.

In other arrangements, user database 610 can electronically store data pertaining to a user who repeatedly engages in one or more dialogues with the digital human. For example, the user data can comprise dates and scheduling information, based on which the digital human conveys at predetermined time an unsolicited reminder to the user. Scene data 110, for example, can generate a dialogue in which the digital human, based on user data electronically stored in user database 610, reminds the user that the user has an important appointment scheduled for a certain time on a specific day. If the DHIP 600 is configured to also interact with other devices (e.g., appliances) through an Internet-of-Things (IoT) architecture, for example, the dialogue can entail the digital human asking the user at a prespecified time electronically stored in user database 610 whether the user is ready for the digital human to start a coffee maker to make the user's morning coffee.

R3 sub-system 612 comprises the back end of DHIP 600. R3 sub-system 612 generates the visual and audible presentation of the digital human (e.g., on a kiosk display, smartphone, or computer). In rendering the digital human as the digital human engages in an interactive dialogue with an individual through interactive application 602, R3 sub-system 612 executes scene data 110 generated with DHDP 100 as described above.

R3 sub-system 612 illustratively includes neural rendering engine 614, xform 616, and audio-to-keypoints (A2KP) 618. Neural rendering engine 614 renders the visual images and audible speech of the digital human based on scene data 110, generating the audio and images in each frame rendered on the display. The fine tuning of the digital human's dialogue and/or behavior (e.g., facial expression, eye movement, gestures) done with digital human editor 106 is implemented by xform 616. Xform 616 can run on top of A2KP 618. A2KP 618 produces keypoints from audio rendered by an electronically stored audio file or text converted to audio. Keypoints are visual representations of the digital human, such as facial features. Keypoints can provide anchors for the digital human's facial expressions, which can be driven by audio or behavior of the digital human. Keypoints can have a one-to-one correspondence with an output frame. The digital human's behavior can be described as, or correspond to, a sequence of keypoints. Accordingly, keypoints can be created for distinct image frames that correspond to portions of audio for rendering the audiovisual display of the digital human. For example, a keypoint can correspond to the digital human's pursing of the lips in saying a word like "Hello" or moving the eyes to look in a certain direction giving a greeting.

In an interactive exchange of dialogue between the digital human and a user, interactive application 602 can determine a contextual response to a user input. The contextual response can be dictated in accordance with a dialogue prespecified by scene data 110 generated by DHDP 100 and loaded to a device that implements interactive application 602. The user input can be a request or a question. For example, the user can request flight information or ask a question about a certain type of product. The user input can be in the form of text, voice, or gesture. In certain arrangements, the user input can be received from a user device such as a computer or smartphone that is communicatively coupled (e.g., via a wired or wireless connection) through a voice or data communication network with a device (e.g., local or cloud-based server) in which DHIP 600 is implemented. In some arrangements, interactive application 602 can execute on the user's device and can communicatively couple with the other elements (foundry 604, vault 606, digital human database 608, user database 610, and R3 sub-system 612) of DHIP 600, which runs on a device, such as a local or cloud-based server. In other arrangements, interactive application 602 executes on a display structure having processing capabilities and that implements the other elements of DHIP 600 or operatively couples with a device such as a local or cloud-based server that implements the other elements of DHIP 600. The display structure in various arrangements can include various operative elements (e.g., camera, microphone, scanner) for receiving the user input.

R3 sub-system 612 generates a digital human based on the data electronically stored in foundry 604. Foundry 604 stores the digital artifacts required to represent a digital human such as machine learning models for different components (e.g., neural rendering engine, xform). Depending on the nature of the contextual response, the digital human also can be generated using data electronically stored in vault 606, which stores information corresponding to user-digital human interactions including user preferences and past interactions to further personalize the interactions. The contextual response to the user input is conveyed by a digital human. In accordance with a dialogue specified by scene data 110, the digital human conveys the contextual response with one or more behaviors (e.g., facial expression, eye movement, gesture) that correspond to the textual response. Optionally, R3 sub-system 612 can include digital human database 608 to electronically store data for generating different digital humans for conveying the contextual response, and user database 610 to electronically store other user-specific data.

Figure 7:
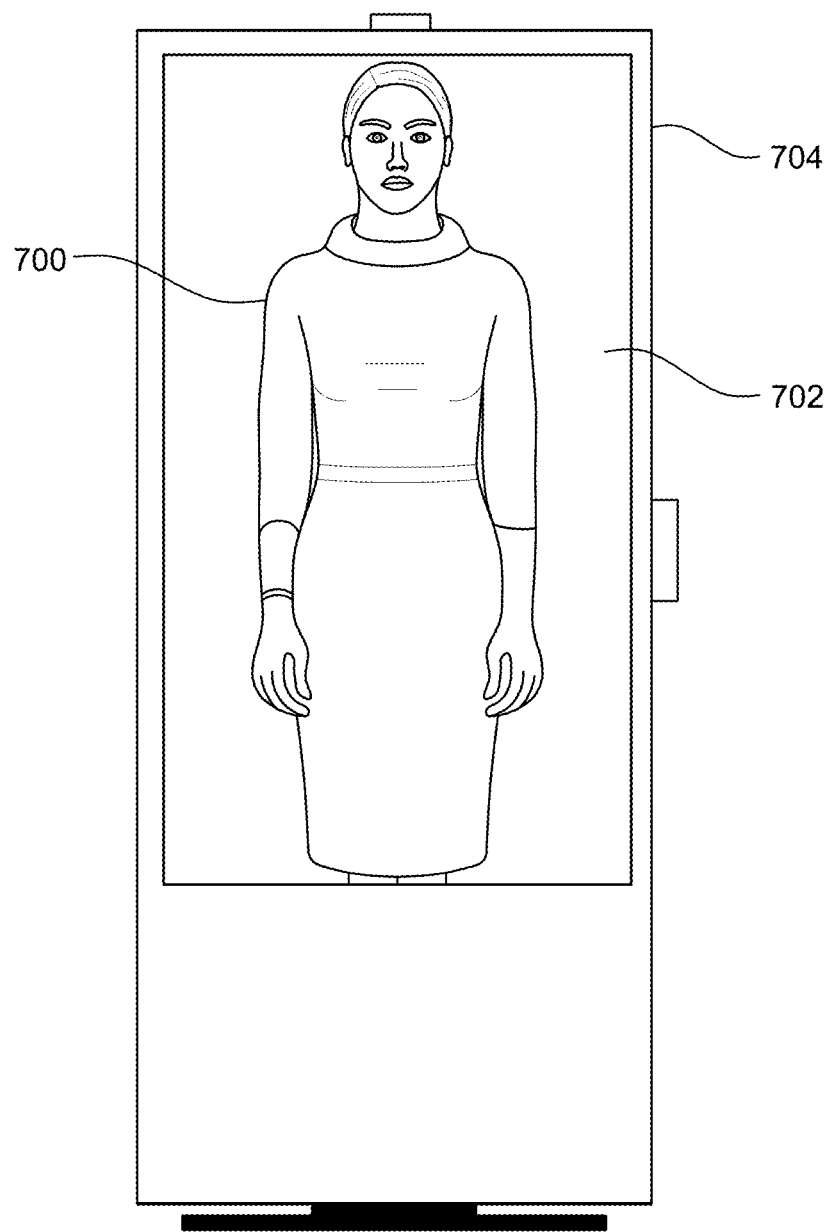
FIG. 7 illustrates generation of a visual rendering of a digital human on a digital human display assembly.

FIG. 7 illustrates a visual rendering of example digital human 700, generation of which is initiated by DHIP 600 for conveying contextual responses in response to received user input. Illustratively, digital human 700 is generated on rectangular display panel 702 of digital human display assembly 704. Digital human 700 can be generated by DHIP 600 in real time for conveying the contextual response to the user in real time. Digital human 700 can convey a contextual response with a predetermined behavior corresponding to the specific contextual response.

Figure 8A:
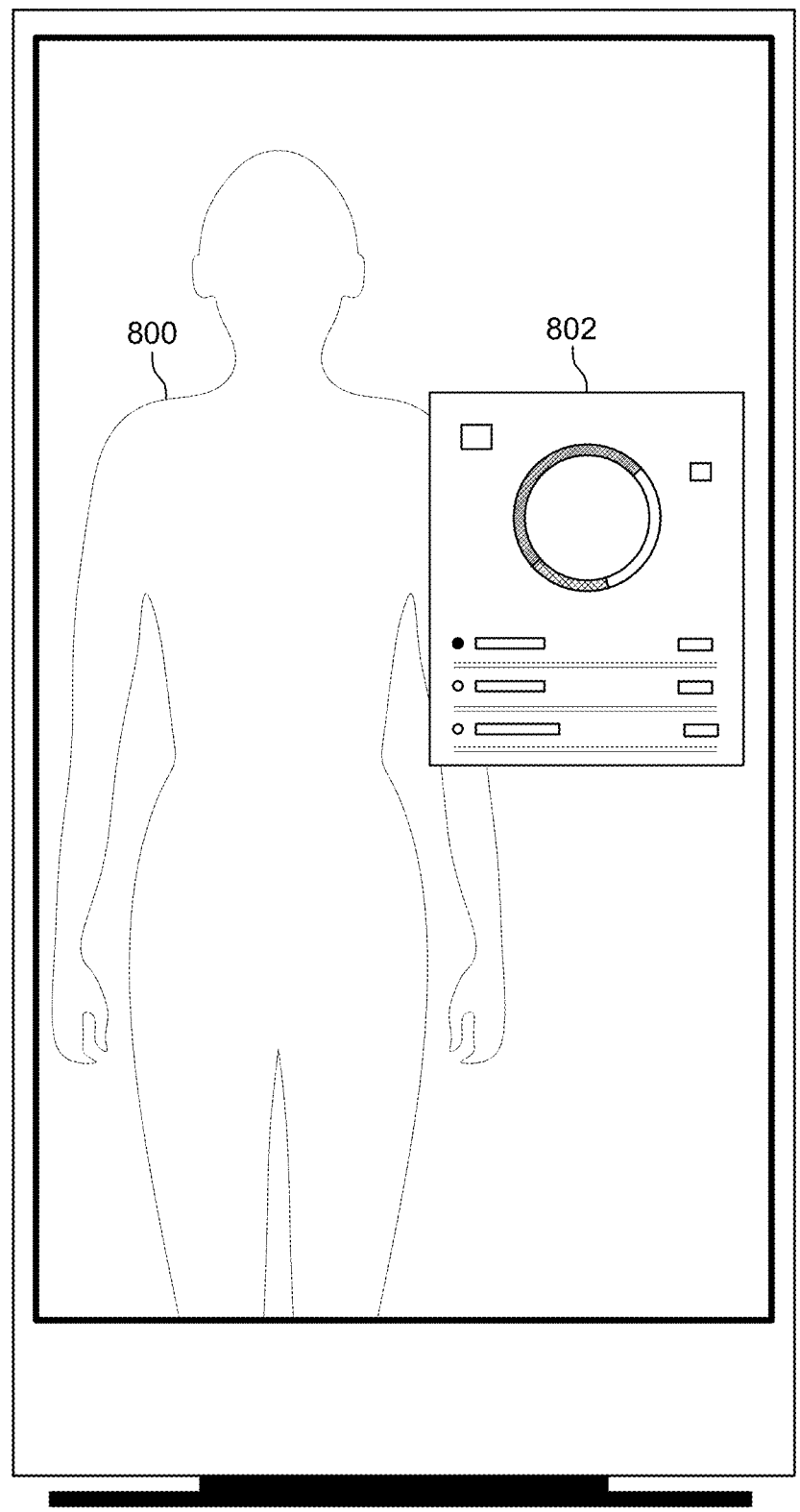
FIGS. 8A and 8B illustrate interaction panels superimposed on a visual rendering of a digital human.
Figure 8B:
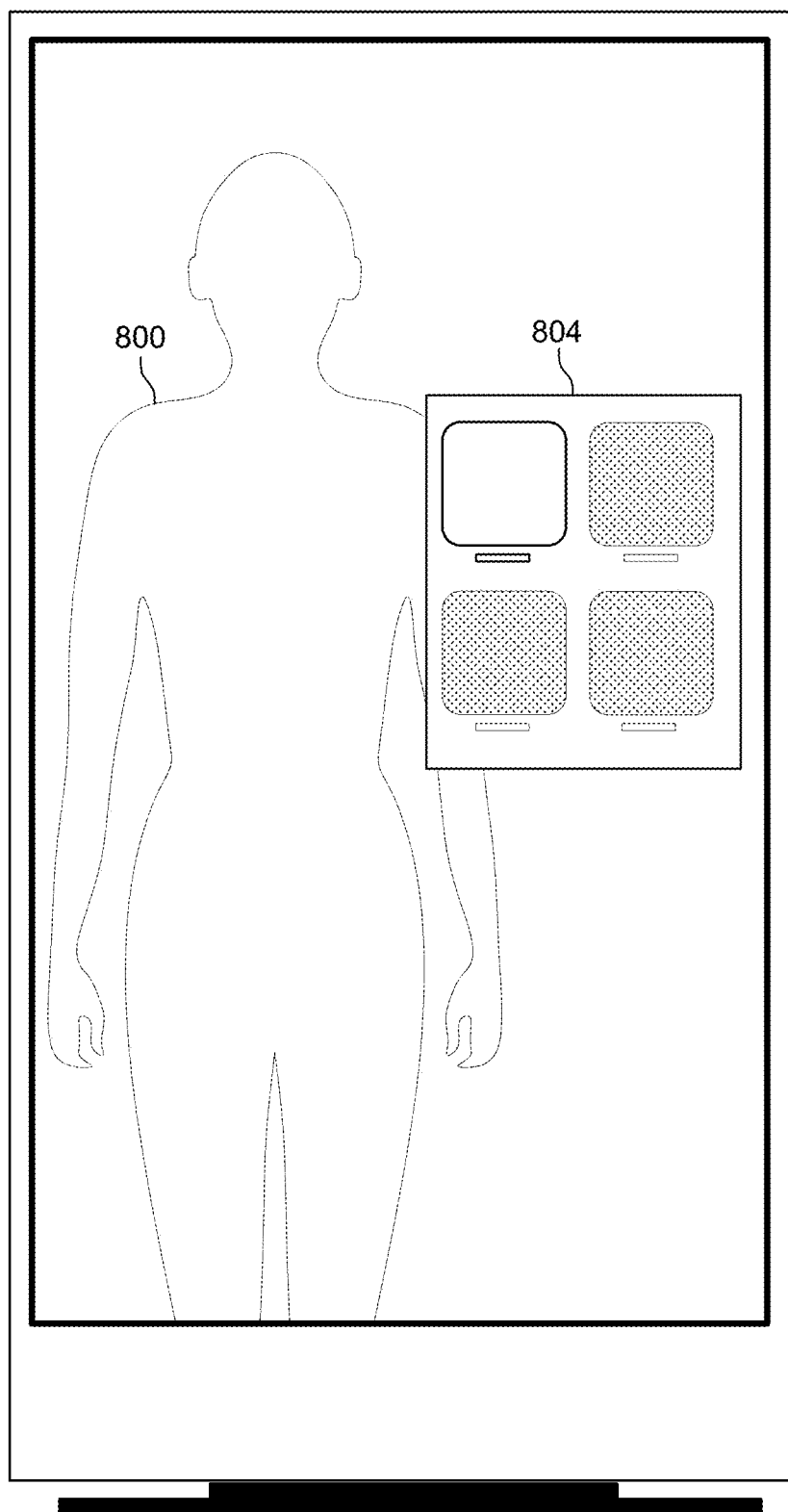

Optionally, as illustrated in FIGS. 8A and 8B, one or more interaction panels can be superimposed on the visual rendering of digital human 800. The panels can be used be to visually convey to, and receive from, the user various types of information and user input. In FIG. 8A, digital human 800 presents interaction panel 802 for conveying various types of information to the user, such as product information, flight information, and the like. In FIG. 8B, digital human 800 presents interaction panel 804 to receive a user input choosing one of four options, either by voicing a selection or touching one of the options presented visually.

Figure 9:
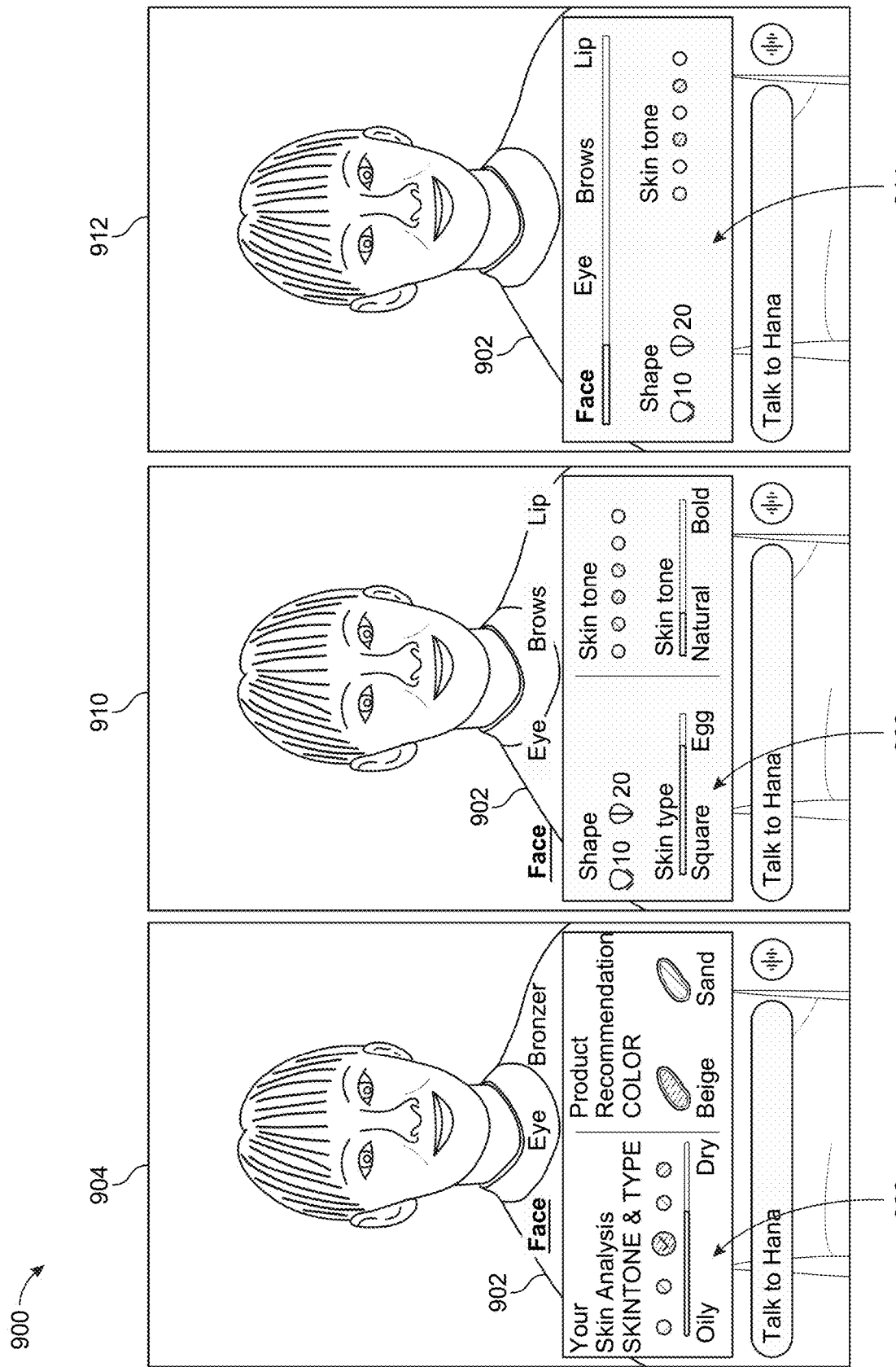
FIG. 9 illustrates an interactive dialogue of a digital human.

FIG. 9 illustrates an example interactive dialogue 900 between a digital human, configured to engage in an exchange with a customer inquiring about a type of product, namely cosmetics. Illustratively, digital human 902 is displayed on screen 904, in which digital human 902 conveys a contextual response to the user's inquiry by inviting the user to speak or touch interaction panel 906 to specify the user's skin type and tone. The user supplies another user input by specifying a skin type and tone in touch box 908 of screen 910. Digital human 902 provides another contextual response by speaking a cosmetic recommendation, which is simultaneously shown on screen 912 in interaction panel 914 of the display. Illustratively, only the facial features of digital human 902 are shown, which can be presented, for example, using a display positioned on a cosmetic counter. Digital human 902, alternatively, can be displayed as a life-sized, full body image, with a digital human display assembly (described in greater detail below) on which digital human 902 appears positioned adjacent the cosmetic counter.

Figure 10:
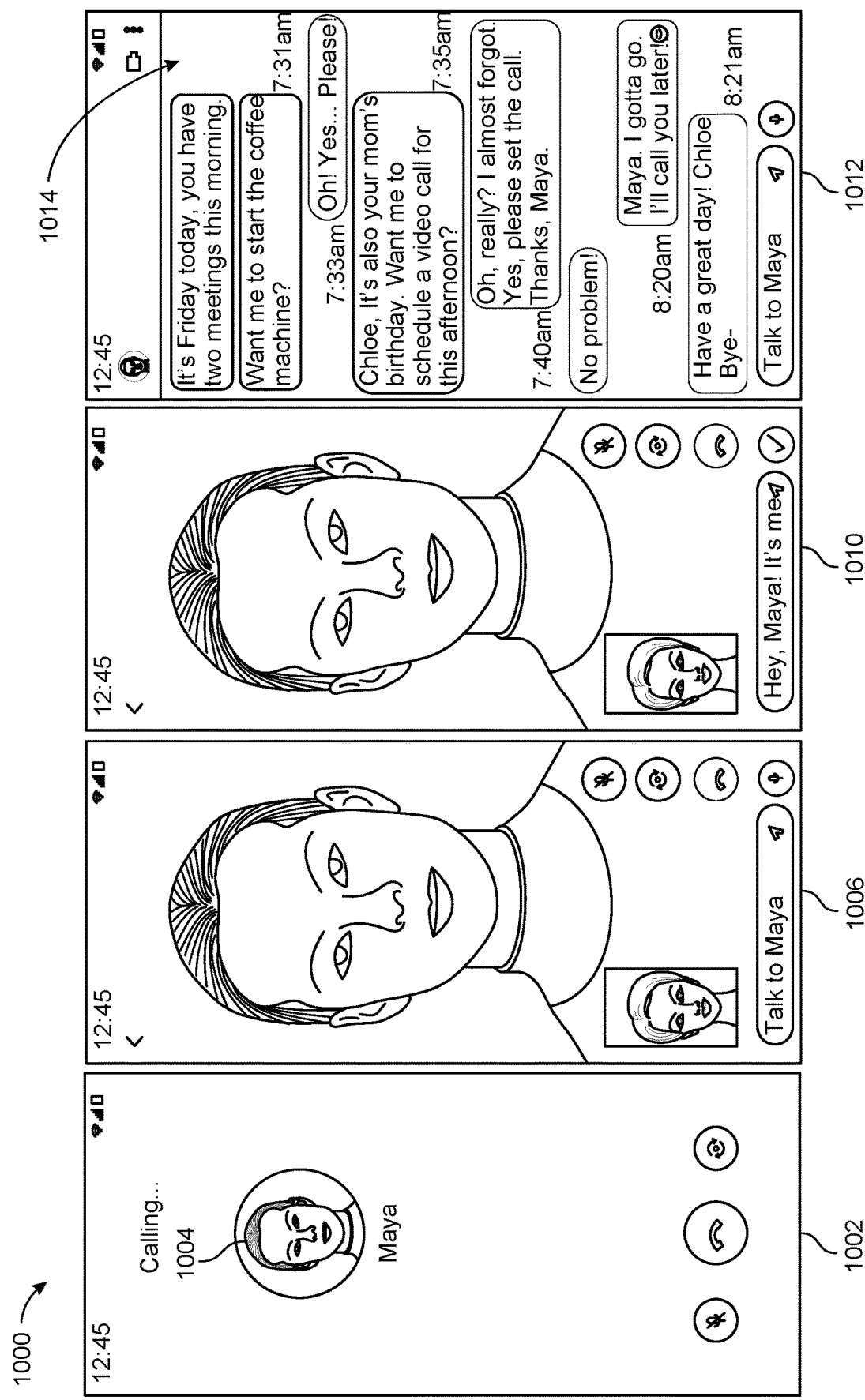
FIG. 10 illustrates an interactive dialogue of a digital human.

FIG. 10 illustrates an example interactive dialogue 1000 that is facilitated by interactive application 602 executing on a user device remotely located from the device (e.g., local or cloud-based server) on which the other elements (foundry 604, vault 606, digital human database 608, user database 610, and R3 sub-system 612) of DHIP 600 execute. Illustratively, screen 1002 appears on the user device (illustratively a smartphone) with the initial user input being the user placing a call to digital human 1004. Interactive dialogue 1000 is initiated with digital human 1004 answering the user's call (e.g., a video call), initiating screen display 1006. In screen 1008, the user is identified. During interactive dialogue 1000, digital human 1004 informs the user of important dates (electronically retrieved from user database 610) and also checks whether the user wishes digital human 1004 to start an IoT coffee maker to begin brewing the user's coffee. Screen 1010 provides text 1012 of the interactive dialogue, which ends with the user indicating the call is ended and digital human 1004 responding, "have a nice day."

Interactive dialogues between a digital human and a user can be conducted via speech, text, or a combination of both. Voice-based interactive dialogues with a digital human can be conducted, for example, by the user speaking to a microphone-endowed digital human display assembly (described below) or computer or another microphone-endowed device (e.g., smartphone). Alternatively, or additionally, an interactive dialogue can be conducted by text messaging over a device (e.g., smartphone, laptop) or touching the screen of a digital human display assembly. Using camera-endowed device, an interactive dialogue can be conducted by gestures (e.g., sign language) between the digital human and user. In various arrangements, an interactive dialogue can be conducted via voice, text, and/or visual gesturing.

Figure 11:
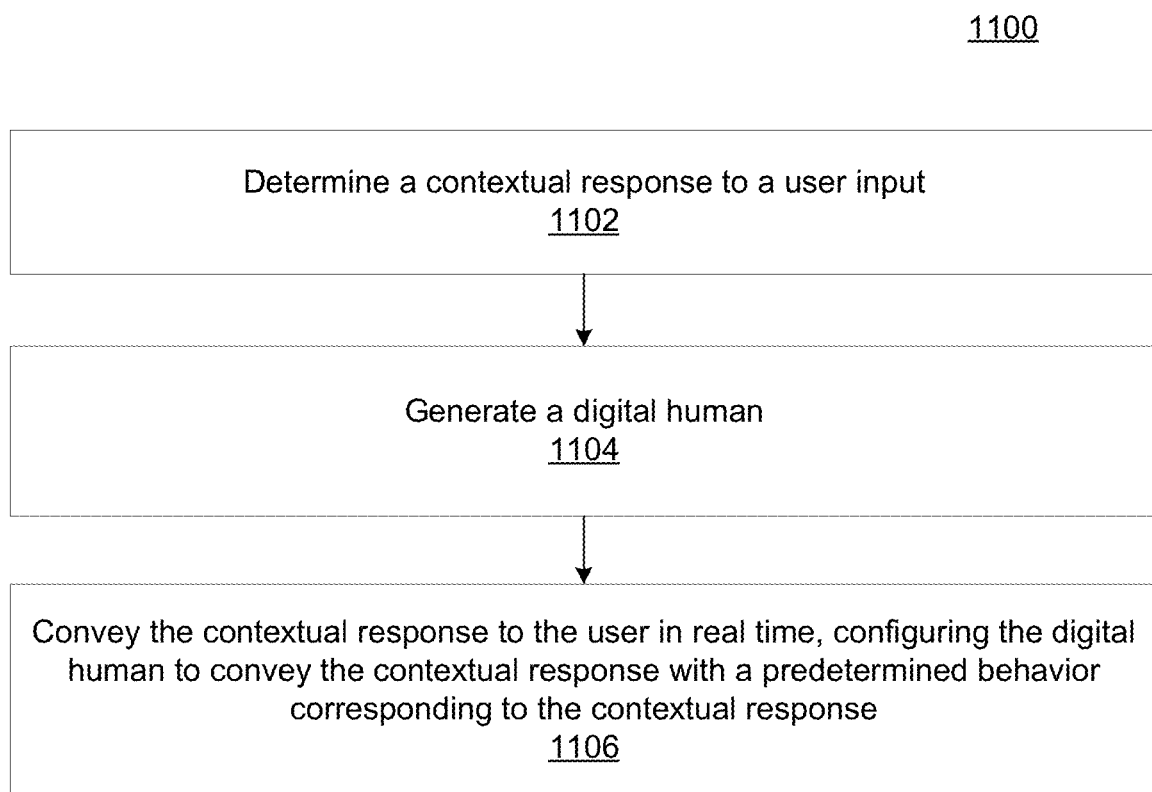
FIG. 11 is a flowchart of an example method of generating a digital human and one or more interactive dialogues between the digital human and a user.

FIG. 11 illustrates an example method 1100 of generating a digital human on a display, the digital human capable of engaging in an interactive dialogue. Method 1100 can be performed using one or more devices that implement a digital human interactive platform as described herein (collectively "the interactive system").

At block 1102, the interactive system determines a contextual response to a user's input. The user input can comprise audible input. The interactive system, in certain arrangements, can capture the audible input using a microphone operatively coupled with the interactive system. The interactive system can determine from the audible input one or more words spoken by the user. Additionally, or alternatively, the user input can comprise visual input. In certain arrangements, the interactive system can capture visual input using a camera operatively coupled with the interactive system. Based on the visual input, the interactive system can determine one or more body movements by the user. The interactive body movements can include facial expression and gestures. In certain arrangements, the interactive system can infer a mood (e.g., surprise, joy, anger) of the user based on user input (e.g., spoken or written words, facial expressions, gestures).

At block 1104, the interactive system generates a digital human, and at block 1106, conveys with the digital human the contextual response. The contextual response can be conveyed by the digital human to the user in real time. The interactive system can configure the digital human to convey the contextual response with a predetermined behavior corresponding to the contextual response. The predetermined behavior can convey a mood or emotion of the digital human and can include one or more facial expressions, eye movements, and/or gestures.

Figure 12:
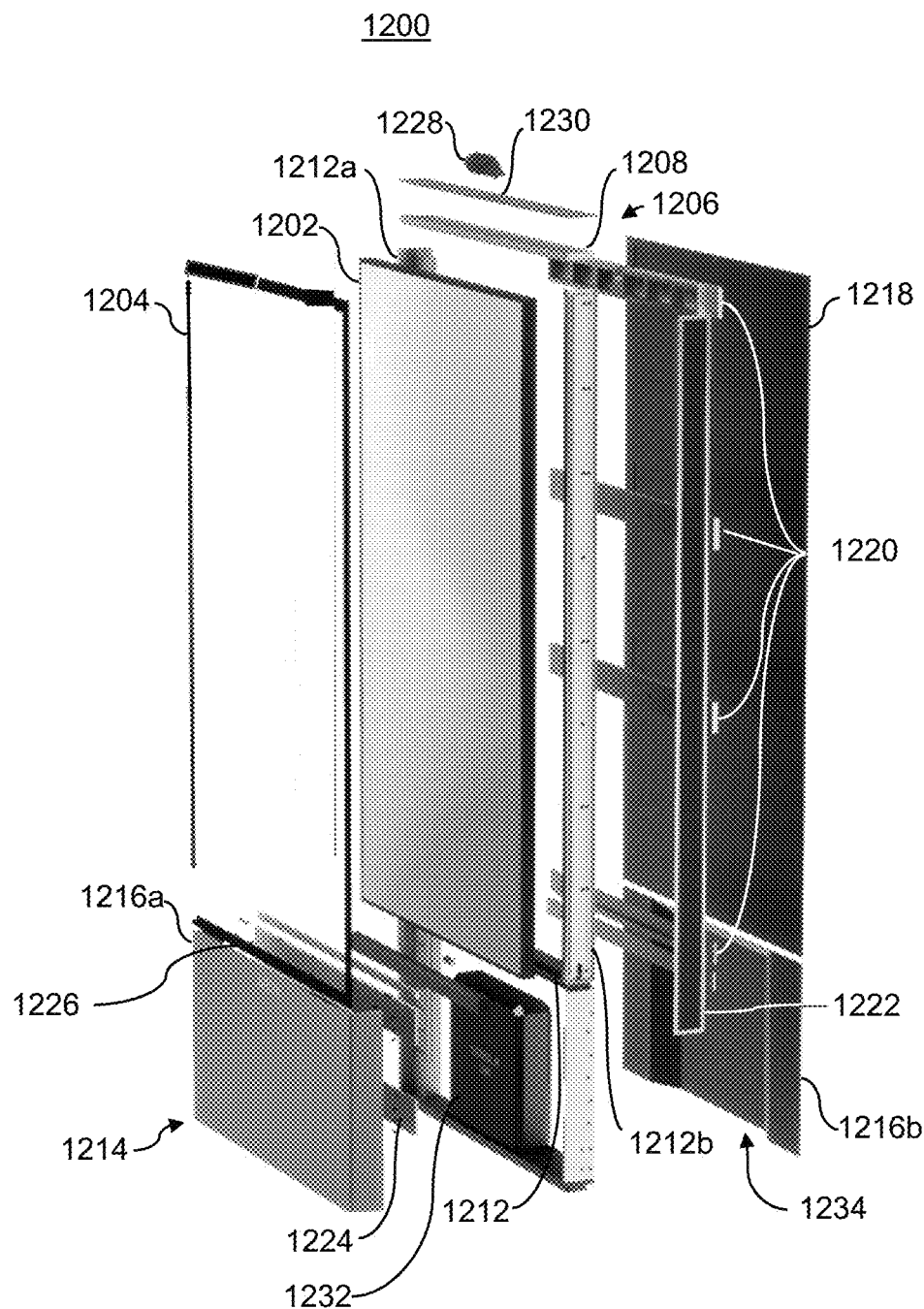
FIG. 12 is an exploded view of an example digital human display assembly.

FIG. 12 is an exploded view of example digital human display assembly 1200. Digital human display assembly 1200 illustratively includes a rectangular display panel 1202. Digital human display assembly 1200 illustratively includes rectangular display panel 1202, which is capable of visually rendering a digital human. Display panel 1202 may visually render the digital human during an interactive dialogue between the digital human and a user. Rectangular display panel 1202 is illustratively a flat panel video display whose pixels comprise an array of LEDs. It should be appreciated that any of a variety of different display panels may be used and that the particular type of display panel used is not intended as a limitation. As illustrated below, rectangular display panel 1202 can be positioned in an upright position and can be shaped with sides longer than the top and bottom borders. Rectangular display panel 1202 can be approximately sized to provide a full or near-full body image of the digital human, as also illustrated below. Glass covering 1204 illustratively extends over the front of rectangular display panel 1202.

In some embodiments, rectangular display panel 1202 and glass covering 1204 are enclosed within frame 1206. Frame 1206 can include top portion 1208, side portions 1210*a* and 1210*b*, and bottom portion 1212.

Illustratively, digital human display assembly 1200 also includes base 1214. Base 1214 is capable of supporting frame 1206, as well as rectangular display panel 1202 and glass covering 1204 enclosed therein, in an upright position. Base 1214 illustratively comprises front portion 1216*a* and back portion 1216*b*. Backplane 1218 can extend upward from back portion 1216*b* of base 1214. Horizontal support beams 1220 can connect to rectangular display panel 1202 and backplane 1218 to provide added support.

Digital human display assembly 1200 also includes LED array 1222, comprising multiple LEDs. LED array 1222, as described in greater detail below, is capable of creating visual effects, which among other functions can communicate to the user expressions, emotions, and/or reactions of the digital human displayed interactively on rectangular display panel 1202. Illustratively, LED array 1222 is positioned on one or both sides (only one of which is in view) of digital human display assembly 1200. In other arrangements, LED array 1222 can be positioned along the top border of digital human display assembly 1200. In still other arrangements, LED array 1222 can comprise LEDS positioned along the top border and one or both sides. The bezel width of the LED array can be selected so as to provide greater screen space on rectangular display panel 1202. For example, with a side-positioned LED array, the bezel width can be minimized for maximum screen space.

Figure 13:
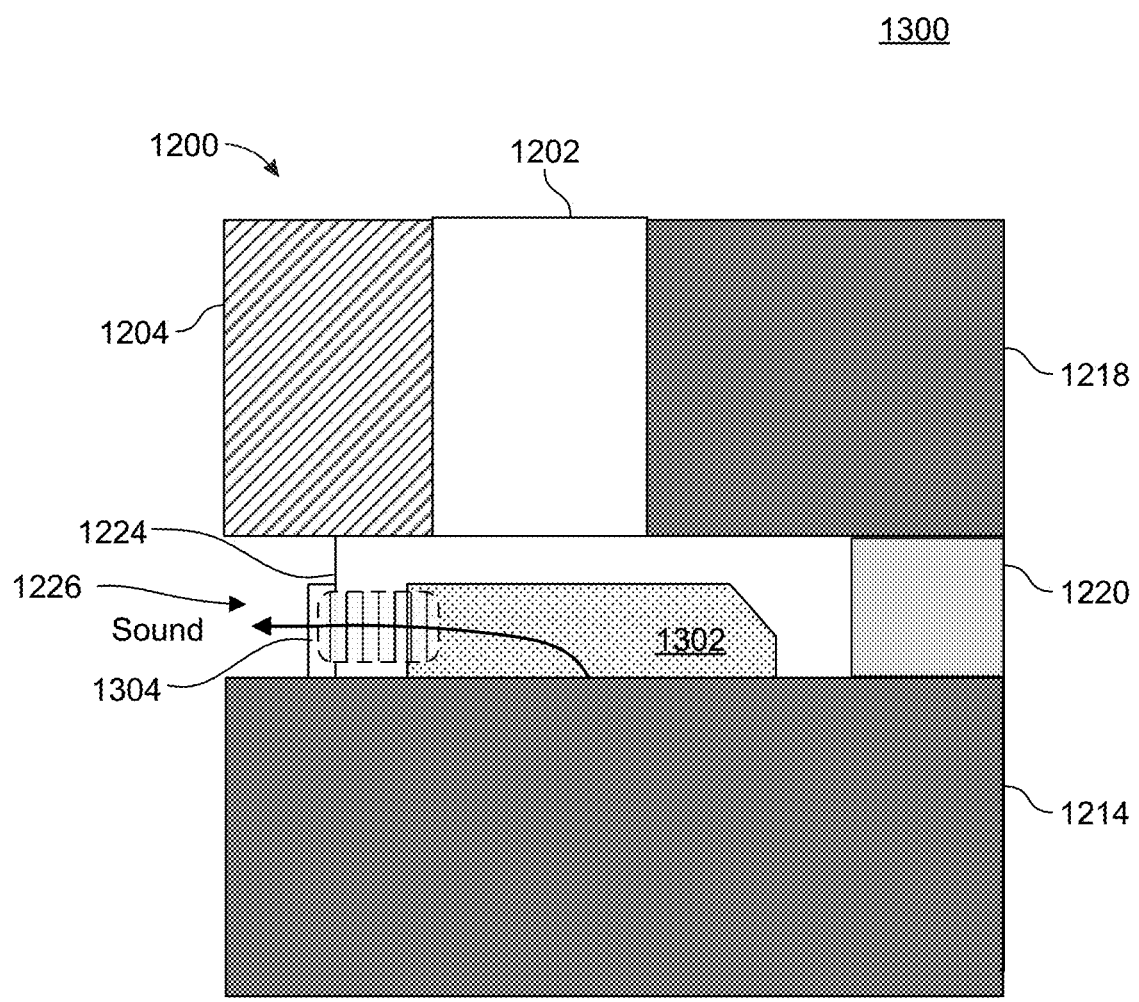
FIG. 13 is a partial cross-section view of an example digital human display assembly.

Digital human display assembly 1200 can include one or more speakers (not explicitly shown). The one or more speakers can be positioned behind sound radiation structure 1224. In some arrangements, sound radiation structure 1224 is formed in the base 1214, specifically in the front portion 1216*a*. In other arrangements, sound radiation structure 1224 is formed between the base 1214 and a bottom portion of glass covering 1204. Sound radiation structure 1224 in certain embodiments can be positioned within groove 1226 between base 1214 and glass covering 1204. Referring additionally to partial cross-section 1300 of digital human display assembly 1200 in FIG. 13, groove 1226 lies between base 1214 and glass covering 1204, and sound radiation structure 1224, positioned within groove 1226, includes speaker 1302 with sound hole 1304 extending into groove 1226. An advantage of the groove structure is that it can protect sound radiation structure 1224 from precipitation such as rain, snow, etc. if digital human display assembly 1200 is positioned outdoors. Optionally, digital human display assembly 1200 also can include a fluid drain formed in a lower portion of base 1214 to allow precipitation to runoff if the digital human display assembly 1200 is outside.

One or more cameras 1228 can be attached to connector 1230, which illustratively is mounted on frame 1206. Camera(s) 1228 can capture images, movements, facial expressions, and gestures of an individual who interacts face-to-face with the digital human rendered on rectangular display panel 1202. One or more other sensors (not explicitly shown) can also be connected to frame 1206. The sensors can include, but are not limited to, a microphone, a fingerprint sensor, a card reader (e.g., capable of reading a magnetic strip and/or "chip" type of card), and/or near-field communication (NFC) sensor.

In certain arrangements, a computer 1232 operatively couples with rectangular display panel 1202. The computer 1232 can store in memory scene data 110, and one or more processors of computer 1232 can execute scene data 110 (e.g., machine-executable instructions and/or video files) for generating the digital human which exhibits pre-specified behaviors while engaging in an interactive dialogue with a user. Computer 1232 is able to process in real time vocal input of a user. Computer 1232 can also process in real time images of the user's movements, facial expressions, and/or gestures using object recognition. As described in greater detail below, the content and tone of the user's verbal input, as well as appearance and movements, can be processed and used to control LED array 1222. Computer 1232 can be positioned within expanded bottom portion 1234 formed in back portion 1216*b* of base 1214.

Figures 14A, 14B:
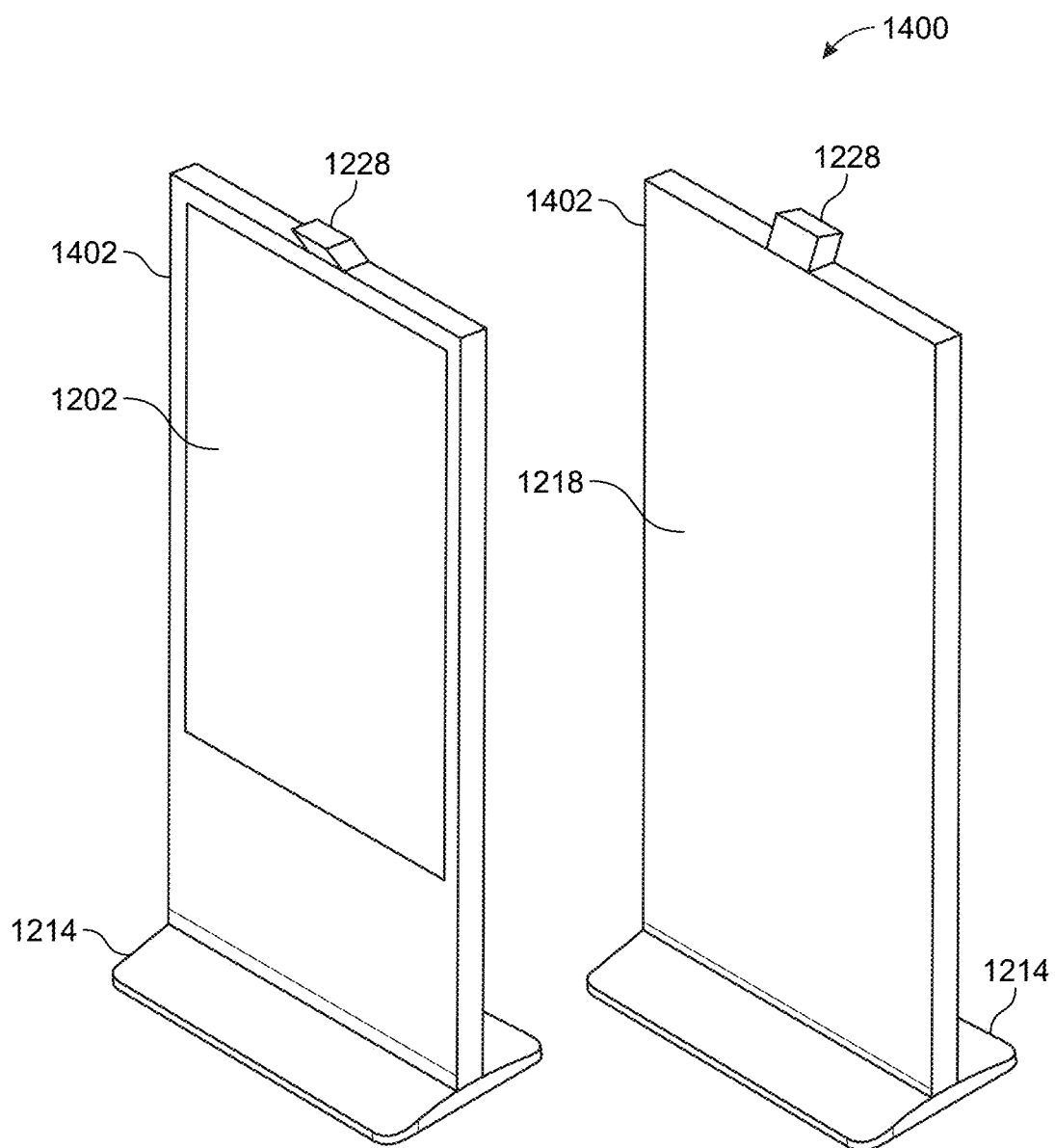
FIGS. 14A-14B illustrates a frameless digital human display assembly.

In certain embodiments, digital human display assembly 1200 does not include frame 1206. Instead, rectangular display panel 1202 is covered by a rimless glass covering, which extends over the front side of the rectangular display panel 1202. The lower edges of rectangular display panel 1202 and rimless glass covering are inserted within or connected to base 1214. Referring additionally to FIGS. 14A and 14B, digital human display assembly 1400 comprises rimless glass covering 1402. In FIG. 14A, rimless glass covering 1402 extends over digital human display panel 1202. Digital human display panel 1202 can be encased in rimless class covering 1402. Alternatively, as illustrated by the back view of digital human display assembly 1400 in FIG. 14B, the front of digital human display panel 1202 can connect to rimless glass covering 1402, and the back of digital human display panel 1202 can connect to backplane 1218. In either arrangement, the rimless glass covering 1402 extends into base 1214, which supports the assembly in an upright position. Camera(s) 1228 and/or other sensors can connect directly to rimless glass covering 1402.

Figure 15:
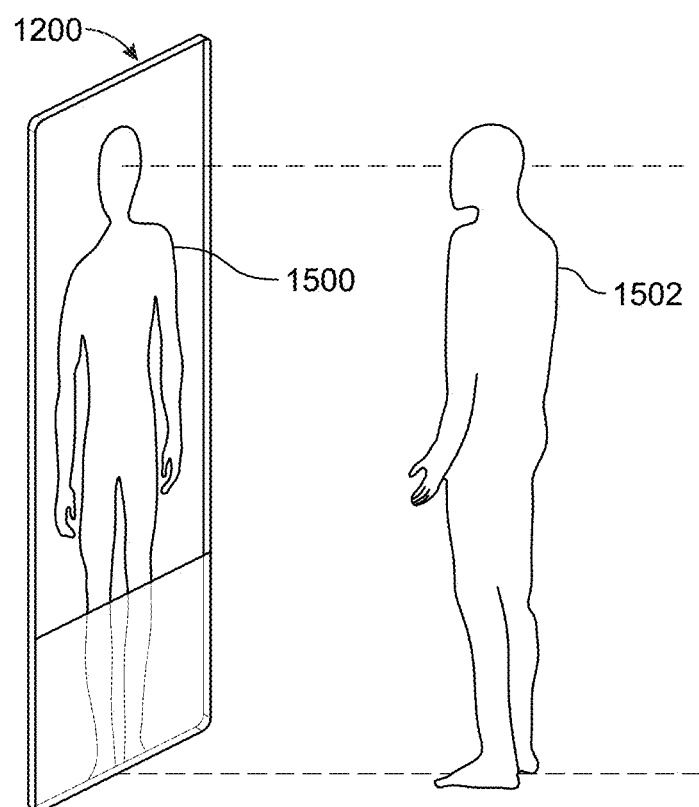
FIG. 15 illustrates an example digital human generated on the digital human display assembly of FIG. 12.

In different embodiments, with and without a frame, digital human display assembly 1200 can comprise a life-sized display, as illustrated in FIG. 15. Implemented in a size comparable to the average height of a human, digital human display assembly 1200 renders digital human 1500 at a size suitable for a face-to-face dialogue with user 1502.

Figures 16A, 16B, 16C:
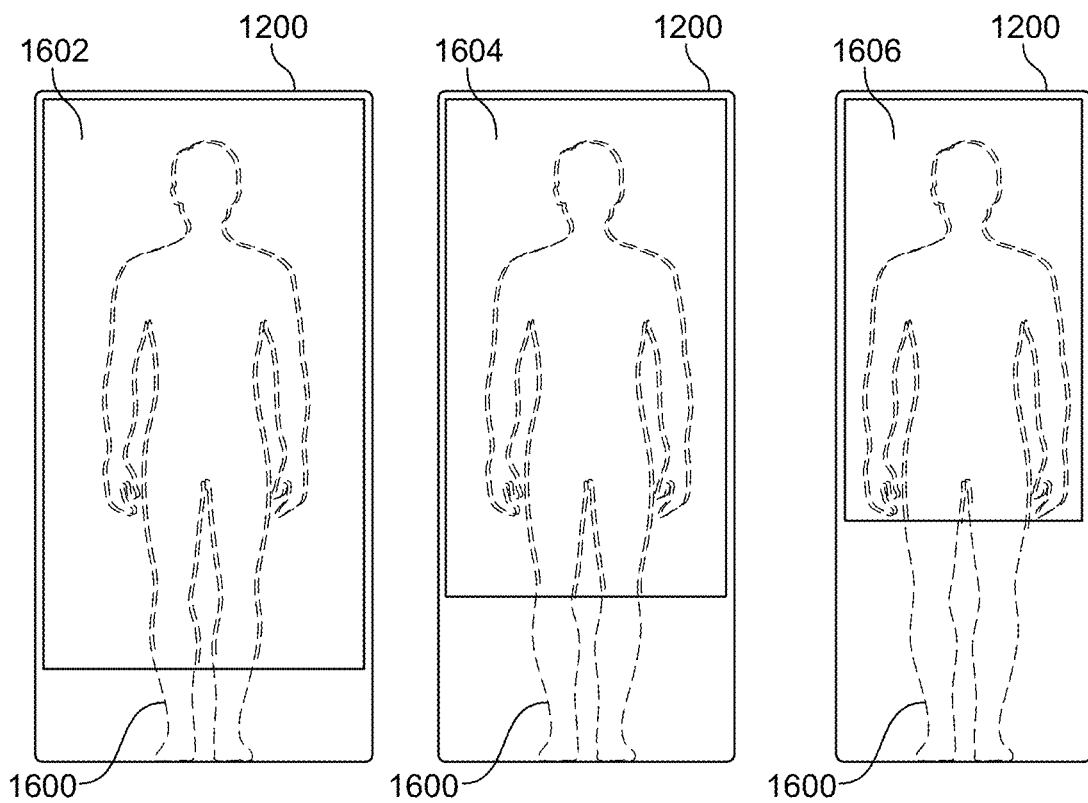
FIGS. 16A-16C illustrate differently sized displays of a digital human generated on the digital human display assembly of FIG. 12.

FIGS. 16A-16C illustrate alternative implementations of digital human display assembly 1200 having different sized displays 1202 each capable of displaying digital human 1600. In FIG. 16A, display 1602 of digital human 1600 is rendered as a near full-body image. In FIG. 16B, display 1604 is rendered to provide an above-knee, three-quarter image of digital human 1600. In FIG. 4C, display 1606 provides only a partial, two-thirds rendering of digital human 1600. In other embodiments, different sized renderings of the digital human can be generated.

Figure 17:
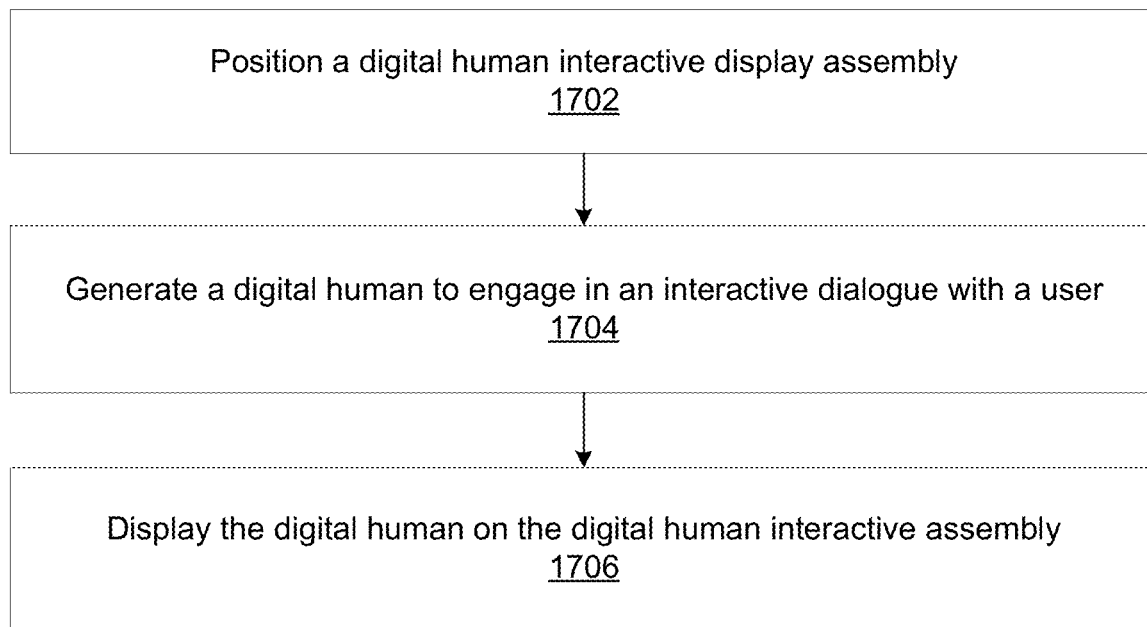
FIG. 17 is a flowchart of a method of displaying a digital human.

FIG. 17 is a flowchart of example method 1700 of displaying a digital human. Method 1700 includes positioning a digital human interactive display assembly at block 1702. The positioning can comprise placing the digital human interactive display assembly adjacent a travelers' path, a customers' path, or a product counter. At block 1704, method 1700 includes generating a digital human configured to engage in an interactive, or soliloquy-type, dialogue with a user. For example, in an interactive dialogue the digital human can respond with instructions and/or information in response to one or more user queries. In a soliloquy-type dialogue, the digital human can convey, for example, information and/or instructions without express user interaction of any kind. Method 1700 includes displaying the digital human on the digital human interactive assembly at block 1706.

Figure 18:
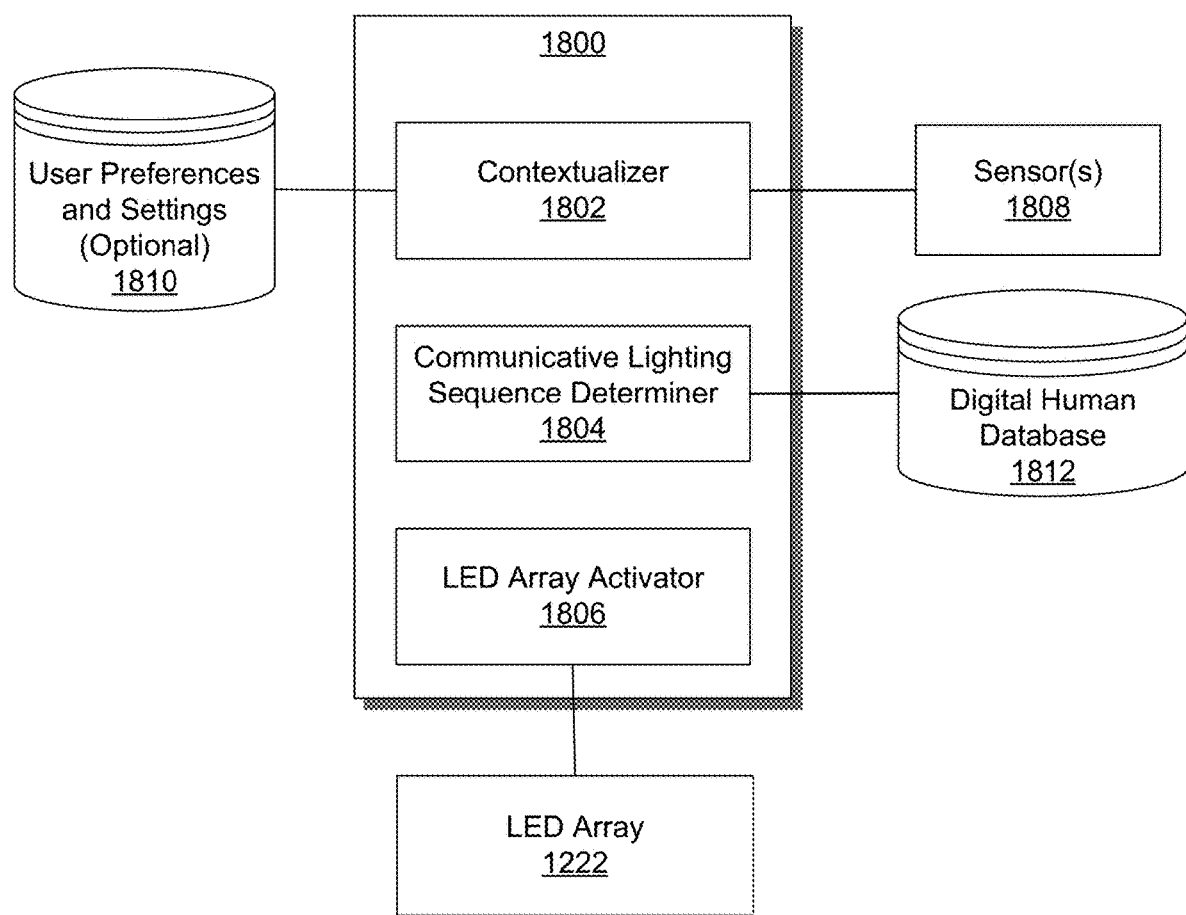
FIG. 18 illustrates an example communicative light system for communicating information pertaining to a digital human.

FIG. 18 illustrates example communicative light system (CLS) 1800 for communicating information pertaining to a digital human. CLS 1800 can be used in conjunction with a digital human display assembly, such as digital human display assembly 1200. In certain embodiments, CLS 1800 operatively couples with DHIP 600. Operatively, CLS 1800 determines a user aspect related to a digital human interaction, determines a lighting sequence indicating a relevant aspect of the digital human, and communicates to the user the relevant aspect by generating the lighting sequence with an LED array, such as LED array 1222. The LED array can be mounted to a digital human display assembly, such as digital human display assembly 1200, CLS 1800 illustratively includes contextualizer 1802, communicative lighting sequence determiner 1804, and LED array activator 1806. Contextualizer 1802, communicative lighting sequence determiner 1804, and LED array activator 1806 can each be implemented in hardware (e.g., dedicated hardwired circuitry), software (e.g., program code executed by one or more processors), or a combination thereof. For example, CLS 1800 in certain embodiments is implemented in a computer system, such as computer system 2312 (FIG. 23). Accordingly, in certain embodiments, CLS 1800 comprises program code that is electronically stored in a memory, such as memory 2328, and executes on one or more processors, such as processor(s) 2316 of computer system 2312 (FIG. 23).

Contextualizer 1802 is capable of determining certain aspects of a user who intends to interact, or is interacting, with a digital human displayed on digital human display assembly 1200. CLS 1800 can determine aspects of the user based on signals generated by one or more sensors 1808, which operatively couple with contextualizer 1802. Optionally, contextualizer 1802 can additionally, or alternatively, base the determination in whole or in part on user preferences and/or settings electronically stored in database 1810. Database 1810 can be electronically stored on the same device in which CLS 1800 is implemented or on a separate device (e.g., cloud-based server) that connects via a wired or wireless connection with CLS 1800 over a communications network (e.g., the Internet or other data communications network). Additionally, or alternatively, CLS 1800 can select one of a plurality of digital humans electronically stored in digital human database 1812. The digital human selected can be selected based on the user aspect. Digital human database 1812 also can be electronically stored locally or remotely.

Communicative lighting sequence determiner 1804 determines a communicative lighting sequence based on the user aspect. The user aspect can be expressed by a voice signal spoken by the user or a textual input of the user. In some arrangements, as described below, the user aspect can be inferred by a facial expression or gesture of the user. The lighting sequence is directed to the specific user aspect. In various scenarios, the user may wish to obtain information or instructions from the digital human, for example. In other scenarios, the user may wish to engage in a more extensive dialogue (e.g., one-way soliloquy or two-way conversation) with the digital human.

LED array activator 1806 generates the light sequence of an LED array. As noted, the LED array can be an LED array such as LED array 1222 of digital human display assembly 1200.

In some arrangements, the user aspect that is determined by contextualizer 1802 is the user's presence within a predetermined distance of the digital human display assembly to which CLS 1800 is connected. Sensor(s) 1808 can include a motion sensor and/or camera for determining the user's presence (e.g., detecting motion or via object detection that a human being is present). LED array activator 1806 generates a lighting sequence in response to the user's presence. The lighting of the array can indicate the digital human's acknowledgment of the user's presence. Initially, the LED array lighting can indicate that digital human is ready to interact and can change in response to detecting the user's presence. For example, a green color can change to yellow, or one or more blinking LEDs can stop blinking.

In other arrangements, the user aspect is an audible signal voiced by the user. Sensor(s) 1808 can include a microphone that captures the audible signal. Contextualizer 1802 can implement voice recognition to determine, based on audible signals captured, the nature of the intended interaction of the user with the digital human. For example, the audible signal voiced by the user can indicate a request or question posed to the digital human by the user. The audible signal voiced by the user additionally, or alternatively, can be a user response to a question or request posed by the digital human. The communicative lighting sequence determined by communicative lighting sequence determiner 1804 can indicate an acknowledgment that the digital human recognizes the request or question. LED array activator 1806 can initiate the communicative lighting sequence, which can also indicate after the acknowledgement that the request or question is being processed.

Communicative lighting sequence determiner 1804 can determine a different light sequence is needed if the request or question posed by the user, response of the user, is not understood or is incomplete. Accordingly, communicative lighting sequence determiner 1804 can determine a lighting sequence understood by the user to indicate the request or question or response needs to be repeated or rephrased. LED activator 1806 generates the lighting sequence to indicating the user needs to repeat or rephrase the request or question posed or response to the digital human.

In still other arrangements, sensor(s) 1808 can include a camera for capturing images of the user. CLS 1800 can implement one or more recognition algorithms to process images and/or recognize objects and/or persons therein. For example, contextualizer 1802 can determine from an image a facial feature from which CLS 1800 determines that the user is one a limited number of individuals authorized to interact with the digital human. communicative lighting sequence determiner 1804 can determine one lighting sequence to indicate authorization and another to indicate a lack thereof.

Contextualizer 1802, for example, can determine from an image a facial expression of the user. CLS 1800 can implement a recognition algorithm that determines from the facial expression a mood of the user. The mood may be one of satisfaction, frustration, or anger. Communicative lighting sequence determiner 1804 can determine a lighting sequence activated with LED array activator 180 to acknowledge recognition of the user's mood by the digital human.

Communicative lighting sequence determiner 1804 also can determine a lighting sequence that indicates a current status, action, and/or mood of the digital human. LED array activator 1806 generates the determined lighting sequence according to the current status, action, or mood of the digital human. For example, the lighting sequence can indicate a status of the digital human that the digital human is active and/or ready to receive a request or question. The lighting sequence, for example, alternatively can indicate that the digital human is inactive and/or not ready to receive a request or a question. The lighting sequence can indicate a current action of the digital human, such as waiting action when the digital human is waiting for a response or follow-up from the user during an extended interaction. The lighting sequence can indicate a listening action while the digital human is receiving input from the user. The lighting sequence can indicate a speaking or writing action of the digital human as the digital human is responding to a request or a question posed by the user.

The realistic, human-like aspects of the digital human include emotions and mood as well as the digital human's facial expressions. Communicative lighting sequence determiner 1804 in certain arrangements thus determines different lighting sequence that correspond to different moods of the digital human. For example, the digital human's mood can be pleasant upon greeting and/or conversing with the user. Accordingly, the corresponding lighting sequence determined by communicative lighting sequence determiner 1804, for example, can be one of mellow blues or greens with low intensity. To invoke a sense of surprise corresponding to a surprised expression that the digital human can display in response to an incomprehensible user input, for example, the corresponding lighting sequence determined by communicative lighting sequence determiner 1804 can be a bright, flashing orange.

The specific mood of the digital human can be generated, and can change, depending on the mood of the user—a user aspect determined by contextualizer 1802 based, for example, on voice and/or facial recognition or other sensor-generated input. Communicative lighting sequence determiner 1804 also can correlate the lighting sequence with the detected moods, behaviors, and/or gestures of the user, which also determine the mood and expressions exhibited by the digital human in responding to the user. For example, the digital human's mood can be calm and the corresponding lighting sequence soothing (e.g., slowly pulsing blues) to invoke sympathy and understanding in response to an irate or agitated user (e.g., business customer or traveler).

FIG. 19 describes certain example communicative lighting sequences that can be determined by communicative lighting sequence determiner 1804. As described, different communicative lighting sequences can be generated based on one or more user aspects and status of a digital human.

Figure 20A:
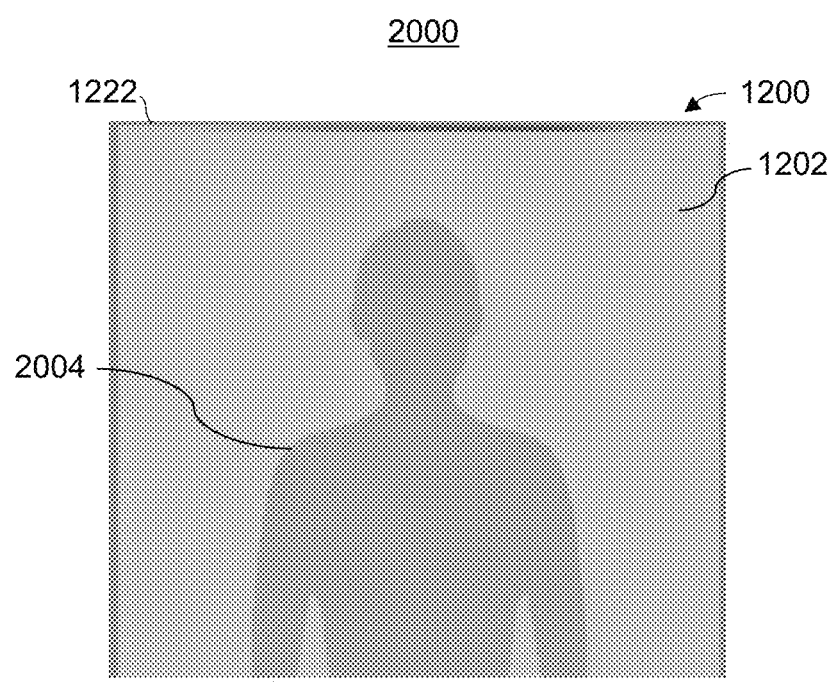
FIGS. 20A-20C illustrate example communicative lighting sequences generated by the communicative light system of FIG. 18.
Figure 20B:
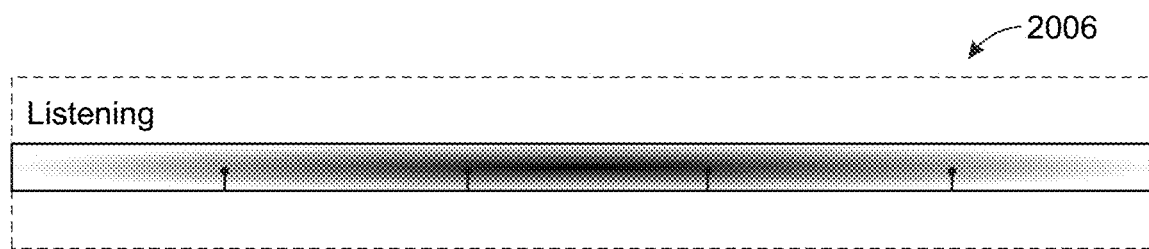
Figure 20C:
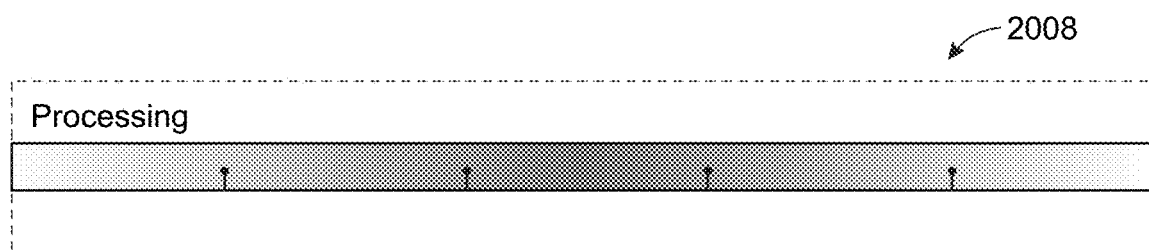

FIGS. 20A-20C illustrate example communicative lighting sequences 2000. LED array 1222 is illustratively positioned along the top border of digital human display assembly 1200, above rectangular display panel 1202 on which digital human 2004 is generated. In various arrangements, LED array 1222 can comprise LEDs positioned on the top border, bottom border, left side, right side, or any combination thereof including along the entire perimeter of human display assembly 1200. FIG. 20B illustrates lighting sequence 2006, which LED array activator 1806 generates as digital human 2004 "listens" to voice input from a user. FIG. 20C illustrates lighting sequence 2008, which LED array activator 1806 generates as digital human 2004 processes the user input.

Figure 21:
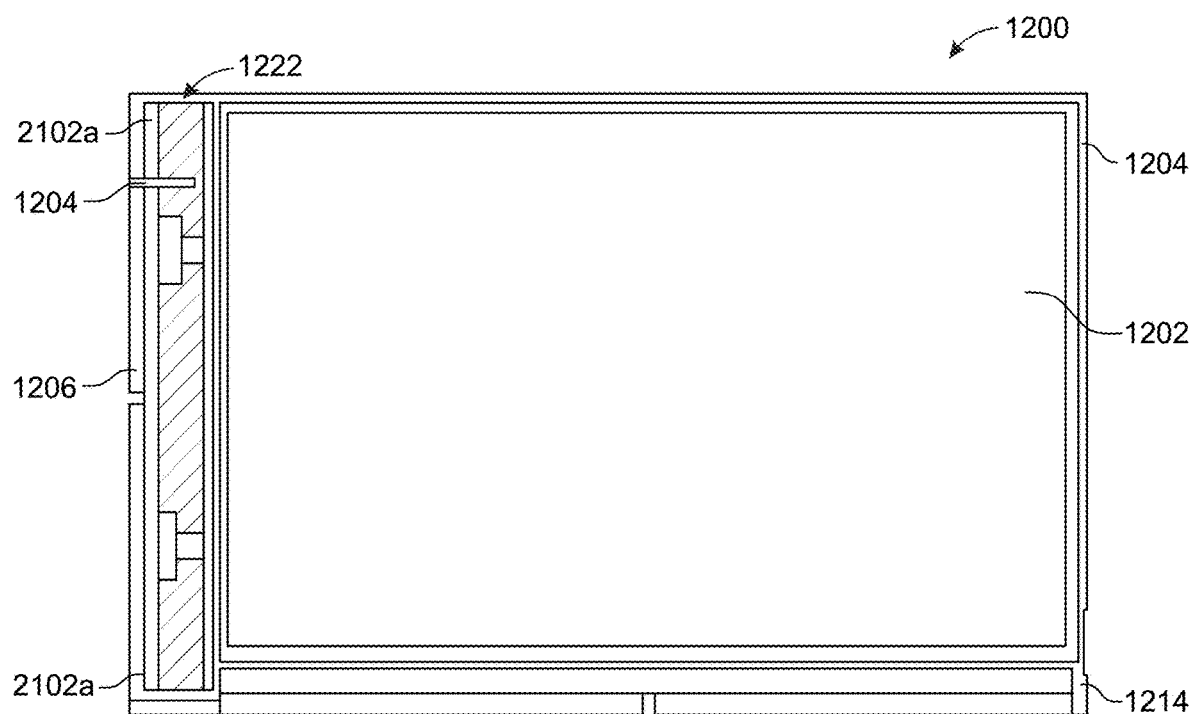
FIG. 21 illustrates an example LED array of a communicative light system.

FIG. 21 illustrates a portion of an example implementation of LED array 1222 that can be activated by LED activator 1806. LED array 1222 illustratively includes LEDs 2102*a* and 2102*b* within light guide plate 2104, over which glass covering 2106 (e.g., mirror type) extends. Light guide plate 2104 can comprise an acrylic panel, which can be formed with polymethyl methacrylate (PMMA) resin. PMMA is a transparent, weather-resistant material. On a bottom and/or top portion of the light guide plate 2104, a matrix of lines can be etched using v-cutting or dots printed or particulates added into the plate itself for directing the light generated by LEDs 2102*a* and 2102*b*.

FIG. 22 is a flowchart of example method 2200. Method 2200 can be performed using one or more devices or computer systems that implement a communicative lighting system as described herein (collectively "the interactive system").

At block 2202, the system determines an aspect of a user based on one or more sensor-generated signals. The system, at block 2204, determines a communicative lighting sequence based on the user attribute, wherein the communicative lighting sequence is configured to communicate to the user a condition of a digital human. At block 2206, the system generates the lighting sequence with an LED array on a digital human display assembly.

In some arrangements, the one or more sensor-generated signals can include a signal generated by a motion sensor indicating that the user is within a predetermined distance of the digital human display assembly. In other arrangements, the one or more sensor-generated signals comprises an image captured by a camera, and the system can determine based on the image a facial feature of the user, the user's facial expression, and/or physical gesture of the user. The one or more sensor-generated signals, in still other arrangements, can comprise an audible signal captured by a microphone, and the system can determine based on the audible signal a request, a question posed, or a response to the digital human by the user.

The lighting sequence initiated by the system can indicate a status of the digital human. The lighting sequence can indicate an active status, a ready status, or an inactive status of the digital human. The lighting sequence can indicate a current action the digital human is engaged in. The action can be a waiting action, a listening action, a receiving action, and/or a speaking action of the digital human. The communicative lighting sequence can indicate a mood of the digital human. The mood of the digital human can be, for example, a neutral mood, a pleasant mood, a joyful mood, a frustrated mood, an angry mood, or a sad mood. As noted above, the digital human's mood can be responsive to the user's mood—a user aspect determinable, for example, based on voice and/or facial recognition, user gestures, or other sensor-generated input. The communicative lighting sequence can be correlated with the mood as part of the expression of the digital human to evoke an appropriate mood in response to the user. For example, the communicative lighting sequence can be one that corresponds to a pleasant greeting upon an initial meeting or final farewell to the user. Or, for example, the communicative lighting sequence can be tailored to a sympathetic or understanding response to an irate or upset user (e.g., customer or traveler).

FIG. 23 illustrates an example of a computing node 2300. In one or more embodiments, computing node 2300 is an example of a cloud-based computing node. Computing node 2300 is also an example of a server. Computing node 2300 is not intended to suggest any limitation as to the scope of use or functionality of embodiments of the invention described herein. Computing node 2300 is capable of performing any of the functionality described within this disclosure.

Computing node 2300 includes a computer system 2312, which is operational with numerous other general-purpose or special-purpose computing system environments or configurations. In certain embodiments, computer 1232 (FIG. 12) is a computer system typified by computer system 2312. Examples of well-known computing systems, environments, and/or configurations that may be suitable for use with computer system 2312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 2312 may be described in the general context of computer system-executable instructions, such as program modules, being executed by a computer system. Generally, program modules may include routines, programs, objects, components, logic, data structures, and so on that perform particular tasks or implement particular abstract data types. Computer system 2312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 23, computer system 2312 is shown in the form of a general-purpose computing device. The components of computer system 2312 may include, but are not limited to, one or more processors 2316, a memory 2328, and a bus 2318 that couples various system components including memory 2328 to processor(s) 2316. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), a Graphics Processing Unit (GPU), programmable logic circuitry, and a controller.

The carrying out of instructions of a computer program by a processor comprises executing or running the program.

Bus 2318 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 2312 typically includes a variety of computer system-readable media. Such media may be any available media that is accessible by computer system 2312, and may include both volatile and non-volatile media, removable and non-removable media.

Memory 2328 may include computer system readable media in the form of volatile memory, such as random-access memory (RAM) 2330 and/or cache memory 2332. Computer system 2312 may further include other removable/non-removable, volatile/non-volatile computer system storage media. By way of example, storage system 2334 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 2318 by one or more data media interfaces. As will be further depicted and described below, memory 2328 may include at least one program product having a set (e.g., at least one) of program modules that are configured to carry out the functions of embodiments of the invention.

Program/utility 2340, having a set (at least one) of program modules 2342, may be stored in memory 2328 by way of example, and not limitation, as well as an operating system, one or more application programs, other program modules, and program data. Each of the operating system, one or more application programs, other program modules, and program data or some combination thereof, may include an implementation of a networking environment. Program modules 2342 generally carry out the functions and/or methodologies of embodiments of the invention as described herein. For example, one or more of the program modules may include DHDP 100 (FIG. 1) or portions thereof. Additionally, or alternatively, the one or more of the program modules may include DHIP 100 (FIG. 6) or portions thereof Program/utility 2340 is executable by processor(s) 2316. Program/utility 2340 and any data items used, generated, and/or operated upon by computer system 2312 are functional data structures that impart functionality when employed by computer system 2312. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 2312 may also communicate with one or more external devices 2314 such as a keyboard, a pointing device, a display 2324, etc.; one or more devices that enable a user to interact with computer system 2312; one or more sensors 2344, such as a camera, microphone, motion sensor, and/or other sensor(s); and/or any devices (e.g., network card, modem, etc.) that enable computer system 2312 to communicate with one or more other computing devices. Such communication can occur via input/output (I/O) interfaces 2322. Still, computer system 2312 can communicate with one or more networks such as a local area network (LAN), a general wide area network (WAN), and/or a public network (e.g., the Internet) via network adapter 2320. As depicted, network adapter 2320 communicates with the other components of computer system 2312 via bus 2318. It should be understood that although not shown, other hardware and/or software components could be used in conjunction with computer system 2312. Examples, include, but are not limited to: microcode, device drivers, redundant processing units, external disk drive arrays, RAID systems, tape drives, and data archival storage systems, etc.

Computing node 2300 is an example of computer hardware. Computing node 2300 may include fewer components than shown or additional components not illustrated in FIG. 23 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

FIG. 24 illustrates an example device 2400 configured for operation as a system. Device 2400 includes one or more processors 2402 coupled to memory 2404 through interface circuitry 2406. Device 2400 stores computer readable instructions (also referred to as "program code") within memory 2404, which is an example of computer readable storage media. Processor(s) 2406 execute the program code accessed from memory 2404 via interface circuitry 2406.

Memory 2404 can include one or more physical memory devices such as local memory 2408 and bulk storage device 2410, for example. Local memory 2408 is implemented as one or more non-persistent memory device(s) generally used during actual execution of the program code. Local memory 2408 is an example of a runtime memory. Examples of local memory 2408 include any of the various types of RAM suitable for use by a processor for executing program code. Bulk storage device 2410 is implemented as a persistent data storage device. Examples of bulk storage device 2410 include a hard disk drive (HDD), a solid-state drive (SSD), flash memory, a read-only memory (ROM), an erasable programmable read-only memory (EPROM), electrically erasable programmable read-only memory (EEPROM), or other suitable memory. Device 2400 can also include one or more cache memories (not shown) that provide temporary storage of at least some program code in order to reduce the number of times program code must be retrieved from a bulk storage device during execution.

Examples of interface circuitry 2406 include, but are not limited to, an input/output (I/O) subsystem, an I/O interface, a bus system, and a memory interface. For example, interface circuitry 2406 can be implemented as any of a variety of bus structures and/or combinations of bus structures including a memory bus or memory controller, a peripheral bus, an accelerated graphics port, and a processor or local bus.

In one or more example implementations, processor(s) 2402, memory 2404, and/or interface circuitry 2406 are implemented as separate components. Processor(s) 2402, memory 2404, and/or interface circuitry 2406 may be integrated in one or more integrated circuits. The various components in device 2400, for example, can be coupled by one or more communication buses or signal lines (e.g., interconnects and/or wires). Memory 2404 may be coupled to interface circuitry 2406 via a memory interface, such as a memory controller or other memory interface (not shown).

Device 2400 can include one or more displays. Illustratively, for example, device 2400 includes display 2412 (e.g., a screen). If device 2400 is configured as an HMD, for example, display 2412 can be a monocular HMD comprising a single optic or a binocular HMD comprising an optic in front of each eye. As an HMD, display 2412 can comprise lenses and semi-transparent mirrors embedded in eyeglasses (also termed data glasses), a visor, or a helmet. Display 2412 can be implemented as a touch-sensitive or touchscreen display capable of receiving touch input from a user. A touch sensitive display and/or a touch-sensitive pad is capable of detecting contact, movement, gestures, and breaks in contact using any of a variety of available touch sensitivity technologies. Example touch sensitive technologies include, but are not limited to, capacitive, resistive, infrared, and surface acoustic wave technologies, and other proximity sensor arrays or other elements for determining one or more points of contact with a touch sensitive display and/or device.

Device 2400 can include camera subsystem 2414. Camera subsystem 2414 can be coupled to interface circuitry 2406 directly or through a suitable input/output (I/O) controller. Camera subsystem 2414 can be coupled to optical sensor 2416. Optical sensor 2416 can be implemented using any of a variety of technologies. Examples of optical sensor 2416 can include, but are not limited to, a charged coupled device (CCD) or a complementary metal-oxide semiconductor (CMOS) optical sensor. Optical sensor 2416, for example, can be a depth sensor. Camera subsystem 2414 and optical sensor 2416 are capable of performing camera functions such as recording or capturing images and/or recording video.

Device 2400 can include an audio subsystem 2418. Audio subsystem 2418 can be coupled to interface circuitry 2406 directly or through a suitable input/output (I/O) controller. Audio subsystem 2418 can be coupled to a speaker 2420 and a microphone 2422 to facilitate voice-enabled functions, such as voice recognition, voice replication, digital recording, and telephony functions.

Device 2400 can include one or more wireless communication subsystems 2424. Each of wireless communication subsystem(s) 2424 can be coupled to interface circuitry 2406 directly or through a suitable I/O controller (not shown). Each of wireless communication subsystem(s) 2424 is capable of facilitating communication functions. Examples of wireless communication subsystems 2424 can include, but are not limited to, radio frequency receivers and transmitters, and optical (e.g., infrared) receivers and transmitters. The specific design and implementation of wireless communication subsystem 2424 can depend on the particular type of device 2400 implemented and/or the communication network(s) over which device 2400 is intended to operate.

As an illustrative and non-limiting example, wireless communication subsystem(s) 2424 may be designed to operate over one or more mobile networks, WiFi networks, short range wireless networks (e.g., a Bluetooth), and/or any combination of the foregoing. Wireless communication subsystem(s) 2424 can implement hosting protocols such that device 2400 can be configured as a base station for other wireless devices.

Device 2400 may include one or more sensors 2426, each of which can be coupled to interface circuitry 2406 directly or through a suitable I/O controller (not shown). Examples of sensor(s) 2426 that can be included in device 2400 include, but are not limited to, a motion sensor, a light sensor, and a proximity sensor to facilitate orientation, lighting, and proximity functions, respectively, of device 2400. Other examples of sensors 2426 can include, but are not limited to, a location sensor (e.g., a GPS receiver and/or processor) capable of providing geo-positioning sensor data, an electronic magnetometer (e.g., an integrated circuit chip) capable of providing sensor data that can be used to determine the direction of magnetic North for purposes of directional navigation, an accelerometer capable of providing data indicating change of speed and direction of movement of device 2400 in 3D, and an altimeter (e.g., an integrated circuit) capable of providing data indicating altitude.

Device 2400 further may include one or more input/output (I/O) devices 2428 coupled to interface circuitry 2406. I/O device(s) 2428 can be coupled to interface circuitry 2406 either directly or through intervening I/O controllers (not shown). Examples of I/O devices 2428 include, but are not limited to, a track pad, a keyboard, a display device, a pointing device, one or more communication ports (e.g., Universal Serial Bus (USB) ports), a network adapter, and buttons or other physical controls. A network adapter refers to circuitry that enables device 2400 to become coupled to other systems, computer systems, remote printers, and/or remote storage devices through intervening private or public networks. Modems, cable modems, Ethernet interfaces, and wireless transceivers not part of wireless communication subsystem(s) 2424 are examples of different types of network adapters that may be used with device 2400. One or more of I/O devices 2428 may be adapted to control functions of one or more or all of sensors 2426 and/or one or more of wireless communication subsystem(s) 2424.

Memory 2404 stores program code. Examples of program code include, but are not limited to, routines, programs, objects, components, logic, and other data structures. For purposes of illustration, memory 2404 stores an operating system 2430 and application(s) 2432. In addition, memory 2404 can store digital human interactive platform program code 2434 for implementing a digital human interactive platform, such as DHIP 600, including interactive application 2436 (FIG. 6).

Device 2400 is provided for purposes of illustration and not limitation. A device and/or system configured to perform the operations described herein can have a different architecture than illustrated in FIG. 24. The architecture can be a simplified version of the architecture described in connection with FIG. 24 that includes a memory capable of storing instructions and a processor capable of executing instructions. In this regard, device 2400 may include fewer components than shown or additional components not illustrated in FIG. 24 depending upon the particular type of device that is implemented. In addition, the particular operating system and/or application(s) included can vary according to device type as can the types of I/O devices included. Further, one or more of the illustrative components can be incorporated into, or otherwise form a portion of, another component. For example, a processor may include at least some memory.

Device 2400 can be implemented as a data processing system, a communication device, or other suitable system that is suitable for storing and/or executing program code. Device 2400 can be implemented as an edge device. Example implementations of device 2400 can include, but are not to limited to, an HMD, a pair of AR glasses, a smart phone or other mobile device or phone, or a wearable computing device. In other example implementations, operations comparable to those described with respect to device 2400 also can be implemented in other computing devices. Other computing devices include, for example, a computer (e.g., desktop, laptop, tablet computer), a television, an entertainment console, an XR system, or other appliance capable of cooperatively operating as a display device (e.g., HMD, AR glasses) or a source device (e.g., smartphone, console, computer) operating in conjunction with a display device, as described herein.

The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The different types of memory, as described herein, are examples of a computer readable storage media. A non-exhaustive list of more specific examples of a computer readable storage medium may include: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, or the like.

As defined herein, "data processing system" means one or more hardware systems configured to process data, each hardware system including at least one processor programmed to initiate operations and memory.

As defined herein, "execute" and "run" comprise a series of actions or events performed by the processor in accordance with one or more machine-readable instructions. "Running" and "executing," as defined herein refer to the active performing of actions or events by the processor. The terms run, running, execute, and executing are used synonymously herein.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, (e.g., "if," "when," or "upon,") mean responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, "real-time" means a level of processing responsiveness that a user or system senses as sufficiently immediate for a particular process or determination to be made, or that enables the processor to keep up with some external process.

As defined herein, "server" means a data processing system configured to share services with one or more other data processing systems. Relatedly, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms "user" and "participant" refer to a human being.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the inventive arrangements. In this regard, each block in the flowcharts or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A digital human display assembly, comprising:
   a display panel enclosed within a frame, wherein the display panel is configured to render a digital human during an interactive dialogue between the digital human and a user, wherein the digital human is computer-generated and rendered using a machine learning model;
   a glass covering enclosed within the frame and extending over a front side of the display panel;
   a base supporting the frame in an upright position;
   a light emitting diode (LED) arrangement positioned on one or more outer portions of the frame; and
   one or more sensors connected to the frame, wherein at least one of the one or more sensors is configured to generate signals indicating an aspect of the user;
   wherein the LED arrangement is configured to display one or more lighting sequences that indicate one or more operational states of the digital human during the interactive dialog with the user, wherein the one or more operational states include at least one of waiting on a response from the user, listening while receiving input from the user, or responding to the user, and wherein at least one of the one or more lighting sequences displayed while responding to the user further depends on the aspect of the user indicated by the one or more sensors.

2. The digital human display assembly of claim 1, further comprising:
   one or more speakers positioned behind a sound radiation structure formed in the base.

3. The digital human display assembly of claim 1, further comprising:
   one or more speakers positioned behind a sound radiation structure formed within a groove of the digital human display assembly, the groove located below a lower portion of the glass covering and a lower portion of the display panel and above a top portion of the base, wherein the sound radiation structure is recessed with respect to the glass covering within the groove.

4. The digital human display assembly of claim 1, further comprising:
   one or more cameras connected to the frame.

5. The digital human display assembly of claim 1, wherein:
   the one or more sensors include at least one of a fingerprint sensor or a near-field communication (NFC) sensor.

6. The digital human display assembly of claim 1, further comprising:
   a computer operatively coupled with the display panel.

7. The digital human display assembly of claim 1, further comprising:
   a fluid drain formed in a lower portion of the base.

8. A digital human display assembly, comprising:
   a display panel configured to visually render a digital human during an interactive dialogue between the digital human and a user;
   a rimless glass covering extending over a front side of the display panel;
   a base connected to a lower edge of the display panel and the rimless glass covering, the base supporting the display panel and the rimless glass covering in an upright position;
   a light emitting diode (LED) arrangement connected with one or more outer border portions of the display panel and the rimless glass covering;
   one or more speakers positioned behind a sound radiation structure formed within a groove of the digital human display assembly, the groove located below a lower portion of the rimless glass covering and a lower portion of the display panel and above a top portion of the base, wherein the sound radiation structure is recessed with respect to the rimless glass covering within the groove; and
   one or more sensors configured to generate signals indicating an aspect of the user;
   wherein the LED arrangement is configured to display one or more lighting sequences that indicate one or more operational states of the digital human during the interactive dialog with the user, wherein the one or more operational states include at least one of waiting on a response from the user, listening while receiving input from the user, or responding to the user, and wherein at least one of the one or more lighting sequences displayed while responding to the user further depends on the aspect of the user indicated by the one or more sensors.

9. The digital human display assembly of claim 8, further comprising:
one or more cameras connected to the rimless glass covering.

10. The digital human display assembly of claim 8, further comprising:
a computer operatively coupled with the display and configured to generate the digital human and control the one or more lighting sequences of the LED arrangement.

11. The digital human display assembly of claim 8, wherein
the one or more sensors include at least one of a fingerprint sensor or a near-field communication (NFC) sensor.

12. The digital human display assembly of claim 8, further comprising:
a fluid drain in a lower portion of the base.

13. A digital human display assembly, comprising:
a display panel enclosed within a frame, wherein the display panel is configured to render a digital human during an interactive dialogue between the digital human and a user;
a glass covering enclosed within the frame and extending over a front side of the display panel;
a base supporting the frame in an upright position;
a light emitting diode (LED) arrangement positioned on one or more outer portions of the frame;
a fluid drain formed in a lower portion of the base; and
one or more sensors configured to generate signals indicating an aspect of the user;
wherein the LED arrangement is configured to display one or more lighting sequences that indicate one or more operational states of the digital human during the interactive dialog with the user, wherein the one or more operational states include at least one of waiting on a response from the user, listening while receiving input from the user, or responding to the user, and wherein at least one of the one or more lighting sequences displayed while responding to the user further depends on the aspect of the user indicated by the one or more sensors.

14. The digital human display assembly of claim 13, further comprising:
one or more speakers positioned behind a sound radiation structure formed in the base.

15. The digital human display assembly of claim 13, wherein the one or more sensors include one or more cameras connected to the frame.

16. A digital human display assembly, comprising:
a display panel configured to visually render a digital human during an interactive dialogue between the digital human and a user, wherein the digital human is computer-generated and rendered using a machine learning model;
a rimless glass covering extending over a front side of the display panel;
a base connected to a lower edge of the display panel and the rimless glass covering, the base supporting the display panel and the rimless glass covering in an upright position;
a light emitting diode (LED) arrangement connected with one or more outer border portions of the display panel and the rimless glass covering; and
one or more sensors, wherein at least one of the one or more sensors is configured to generate signals indicating an aspect of the user;
wherein the LED arrangement is configured to display one or more lighting sequences that indicate one or more operational states of the digital human during the interactive dialog with the user, wherein the one or more operational states include at least one of waiting on a response from the user, listening while receiving input from the user, or responding to the user, and wherein at least one of the one or more lighting sequences displayed while responding to the user further depends on the aspect of the user indicated by the one or more sensors.

17. The digital human display assembly of claim 16, further comprising:
a fluid drain formed in a lower portion of the base.

18. The digital human display assembly of claim 16, further comprising:
one or more speakers positioned behind a sound radiation structure formed in the base.

19. The digital human display assembly of claim 13, further comprising:
a computer operatively coupled with the display and configured to generate the digital human and control the one or more lighting sequences of the LED arrangement.

* * * * *